(12) United States Patent
Niwa et al.

(10) Patent No.: US 6,925,538 B2
(45) Date of Patent: Aug. 2, 2005

(54) EXTENDING THE FUNCTIONALITY OF A MULTI-FUNCTIONAL APPARATUS

(75) Inventors: Nobuyuki Niwa, Tokyo (JP); Naoshi Inoue, Kanagawa-ken (JP); Ryoichiro Sato, Kanagawa-ken (JP); Takashi Hosoda, Kanagawa-ken (JP); Toshiyuki Makida, Gunma-ken (JP); Makoto Tsuchiya, Kanagawa-ken (JP); Takeshi Ooya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/430,186

(22) Filed: May 7, 2003

(65) Prior Publication Data

US 2003/0200403 A1 Oct. 23, 2003

Related U.S. Application Data

(62) Division of application No. 08/692,670, filed on Aug. 6, 1996, now Pat. No. 6,594,737, which is a continuation of application No. 08/266,688, filed on Jun. 28, 1994, now abandoned.

(30) Foreign Application Priority Data

Jun. 29, 1993 (JP) .............................................. 5-187574

(51) Int. Cl.⁷ ............................................. G06F 13/00
(52) U.S. Cl. ........................ 711/154; 717/173; 717/178
(58) Field of Search ........................ 711/154, 102–104, 711/147; 709/219, 227, 326, 213; 710/8, 10–11, 16, 62, 72; 717/168, 178; 358/1.1, 1.6, 400

(56) References Cited

U.S. PATENT DOCUMENTS

| | | | |
|---|---|---|---|
| 4,724,521 A | | 2/1988 | Carron et al. ............... 364/300 |
| 5,109,484 A | | 4/1992 | Hughes et al. .............. 395/200 |
| 5,274,765 A | | 12/1993 | Le Gallo ..................... 395/275 |
| 5,323,393 A | | 6/1994 | Barrett et al. .............. 370/85.8 |
| 5,349,678 A | | 9/1994 | Morris et al. ............... 395/800 |
| 5,371,858 A | | 12/1994 | Miller et al. ................ 395/275 |
| 5,377,259 A | | 12/1994 | Butler et al. .................. 379/93 |
| 5,452,289 A | | 9/1995 | Sharma et al. ............. 370/32.1 |
| 5,539,530 A | * | 7/1996 | Reifman et al. ............ 358/402 |
| 5,577,244 A | * | 11/1996 | Killebrew et al. .......... 717/169 |
| 5,613,089 A | | 3/1997 | Hornbuckle ................ 395/491 |
| 5,617,518 A | * | 4/1997 | Kuwamoto et al. ........ 358/1.15 |
| 5,784,663 A | * | 7/1998 | Hayashi et al. ................ 399/8 |
| 5,805,297 A | | 9/1998 | Furuya et al. .............. 358/400 |

* cited by examiner

*Primary Examiner*—Denise Tran
(74) *Attorney, Agent, or Firm*—Fitzpatrick, Cella, Harper & Scinto

(57) ABSTRACT

A multi-functional apparatus of all-in-one type has a plurality of functions and comprises a plurality of devices having respective functions, a designation device for designating one of the functions, where each function utilizes at least one of the plurality of devices, and a controller for controlling at least one of the plurality of devices for execution of the designated one function. A management device manages information that specifies an external apparatus from which an extension program is to be acquired for execution of the designated one function, and an acquisition device acquires the extension program from the specified external apparatus based on the managed information for extension of the functions of the multi-functional apparatus.

8 Claims, 37 Drawing Sheets

| NO. | PROGRAM NAME | TERMINAL NO. | STORAGE NO. IN RAM |
|---|---|---|---|
| 1 | COPY | 1111 | 1 |
| 2 | FAX XMIT | 1111 | 2 |
| 3 | TEL INFO PRINT | 2222 | 1 |
| 4 | ENLARGED COPY | 2222 | 2 |
| 5 | AUTO ANSWER PHONE | 2222 | 3 |
| 6 | STILL IMAGE PRINT | 3333 | 1 |

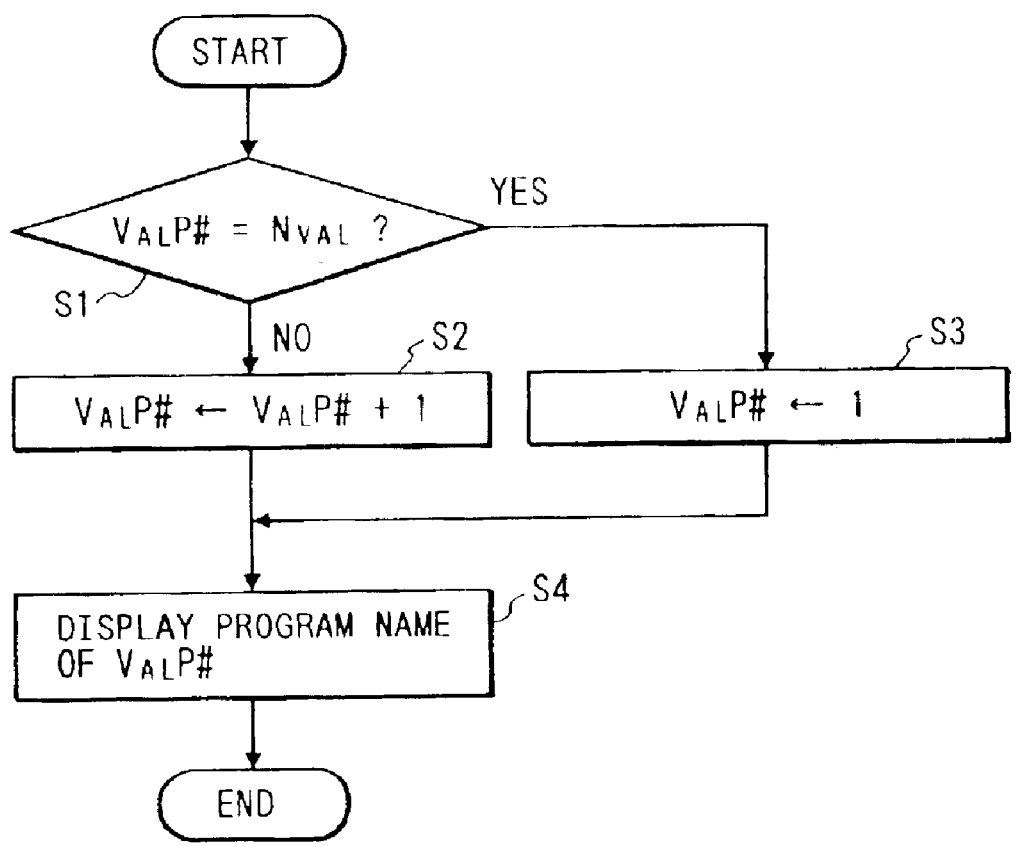

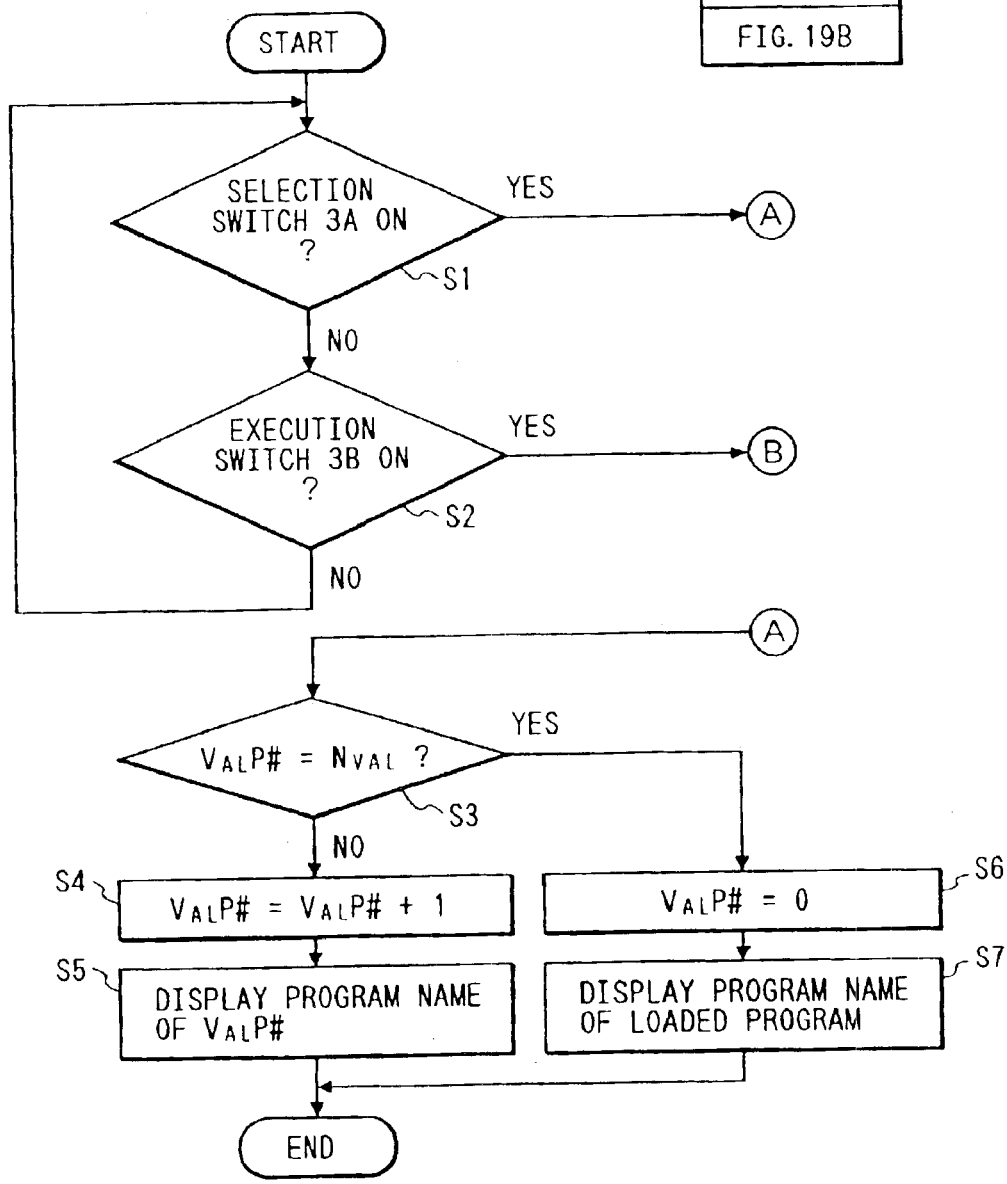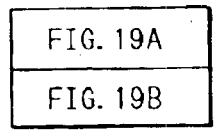

| NO. | PROGRAM FILE | PROGRAM NAME |
|---|---|---|
| 1 | COPY EXE | COPY |
| 2 | FAX SEND EXE | FAX XMIT |
| 3 | TEL INFO EXE | TEL INFO PRINT |

| PROGRAM ADDRESS | PROGRAM NAME |
|---|---|
| 0×01000 | COPY |

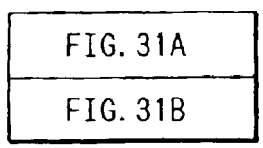
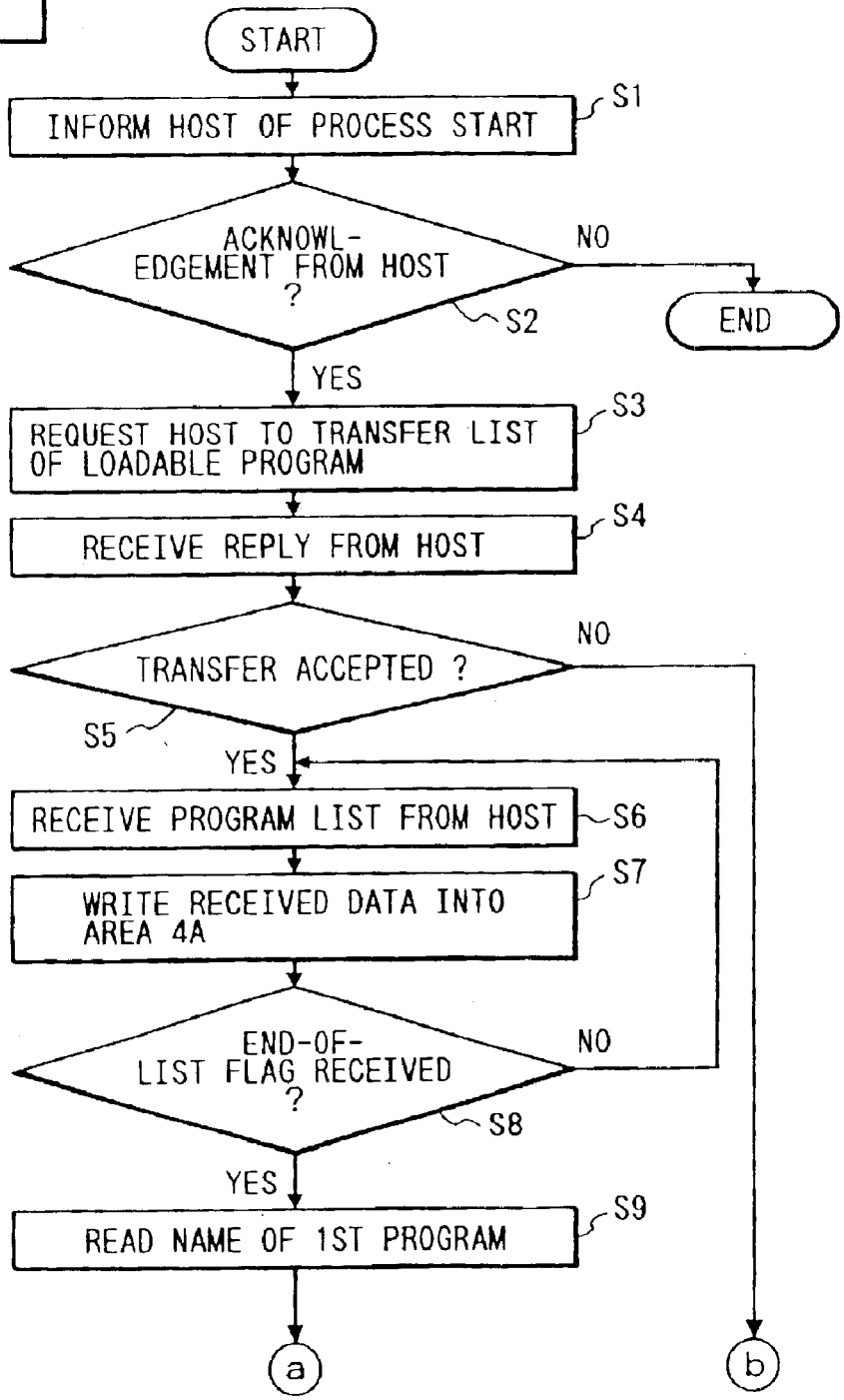

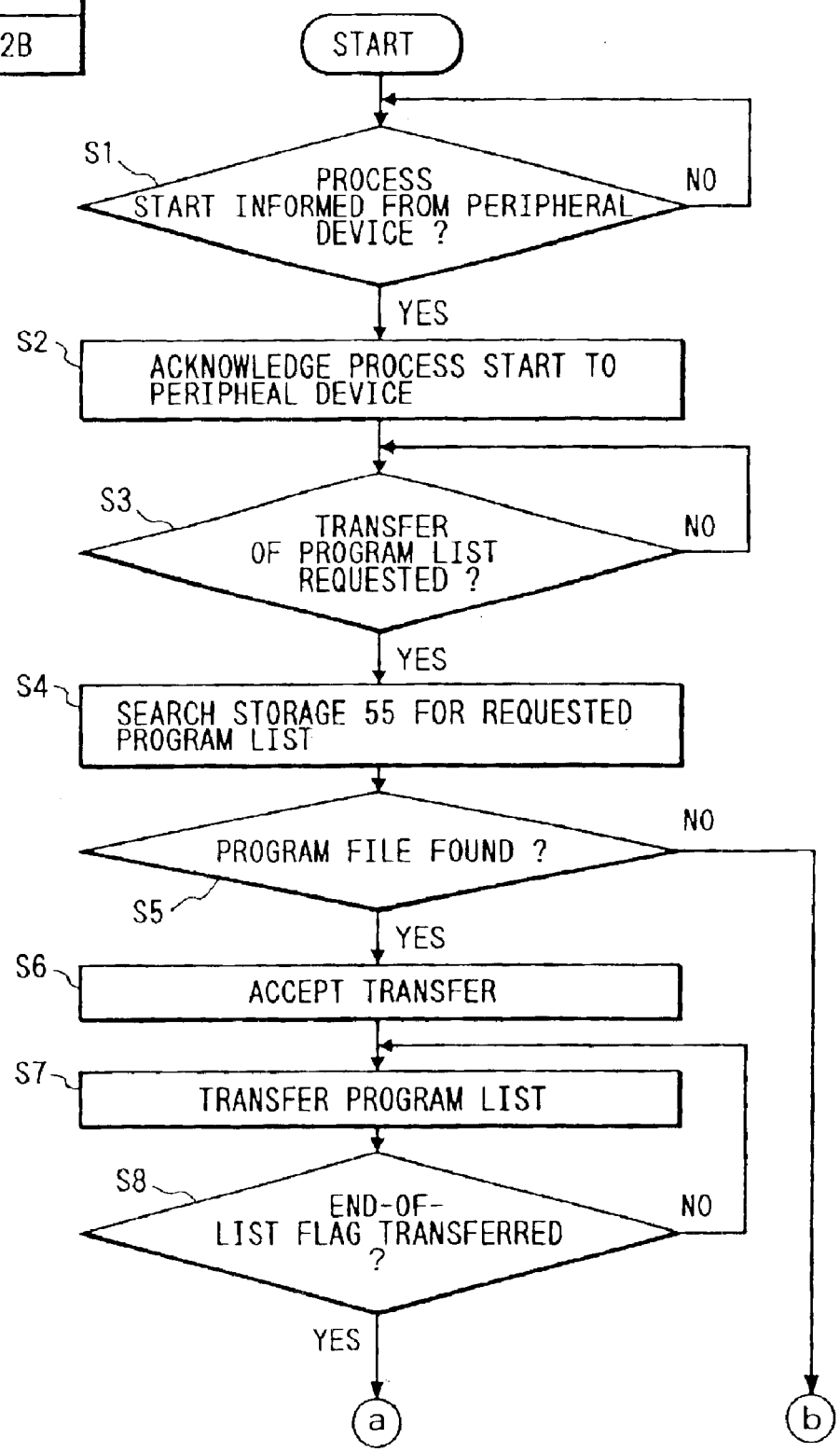

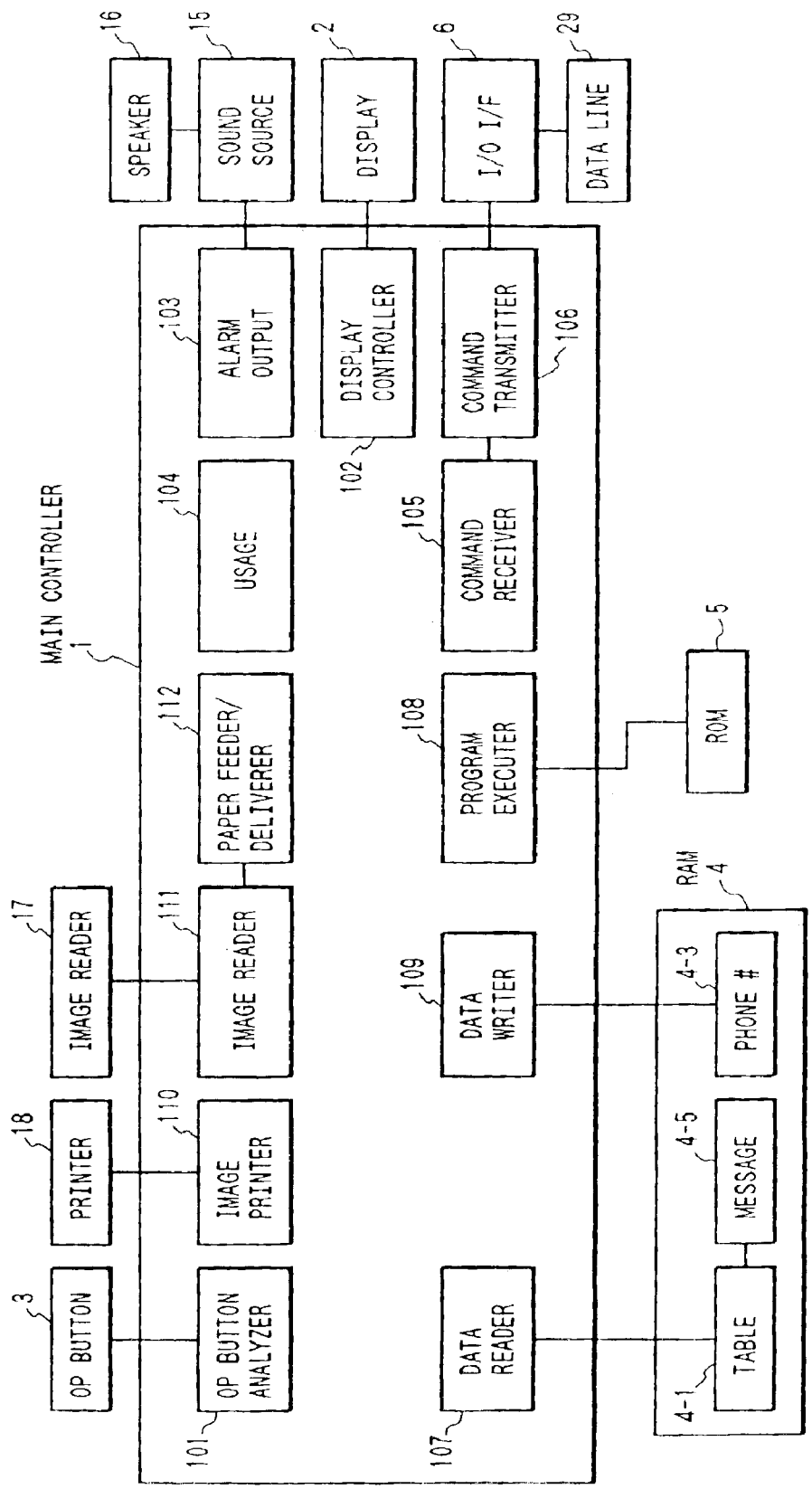

EXTENDING THE FUNCTIONALITY OF A MULTI-FUNCTIONAL APPARATUS

This application is a divisional of application Ser. No. 08/692,670, filed Aug. 6, 1996, now U.S. Pat. No. 6,594,737, which is a continuation of application Ser. No. 08/266,688, filed Jun. 28, 1994, abandoned.

BACKGROUND OF THE INVENTION

1. Field of the Invention

The invention relates to a peripheral device of a computer apparatus and, more particularly, to a compound peripheral device which is connected to a computer apparatus and executes different function processes.

2. Related Background Art

Hitherto, a peripheral device of a computer apparatus, for example, a peripheral device such as a printer or the like of a computer executes only the function which the peripheral device itself has. To execute the functions of the applications other than the above function such as image input, communication of image information, file management of image information, and the like, it is a general way that a computer system is constructed by connecting each peripheral device to the computer through each interface or a system is constructed by connecting an upper apparatus having such a function and the computer.

In case of constructing the computer system as mentioned above, there are problems such that the number of peripheral devices increases in accordance with the necessary function processes, the number of wiring cables increases, an installation space is occupied by them, and extremely large costs are required to expand the system.

SUMMARY OF THE INVENTION

The present invention is made to solve the above problems and it is an object of the invention to provide a compound peripheral device in which an application program which has been stored on the side of a server computer or a host computer and which can be executed by each function processing means of a compound peripheral device is down loaded into the compound peripheral device which can be communicated with the server computer which is connected through a telephone network or with the host computer which is connected through a communication network, and by executing the necessary application program while managing such application programs, a change in function of each function processing means, an expansion of the function, or the like can be cheaply and efficiently executed without connecting any external apparatus.

BRIEF DESCRIPTION OF THE DRAWINGS

FIG. 16 is a flowchart showing an example of an execution processing procedure of a non-resident program based on a selection switch 3a shown in FIG. 14;

FIG. 17 shows an example of a program management table which is stored in the program management table storage area shown in FIG. 14;

FIG. 38 is a block diagram showing the fifth function processing construction in the compound peripheral device showing the fourth embodiment of the invention.

DETAILED DESCRIPTION OF THE PREFERRED EMBODIMENTS

[First Embodiment]

Figure 1:
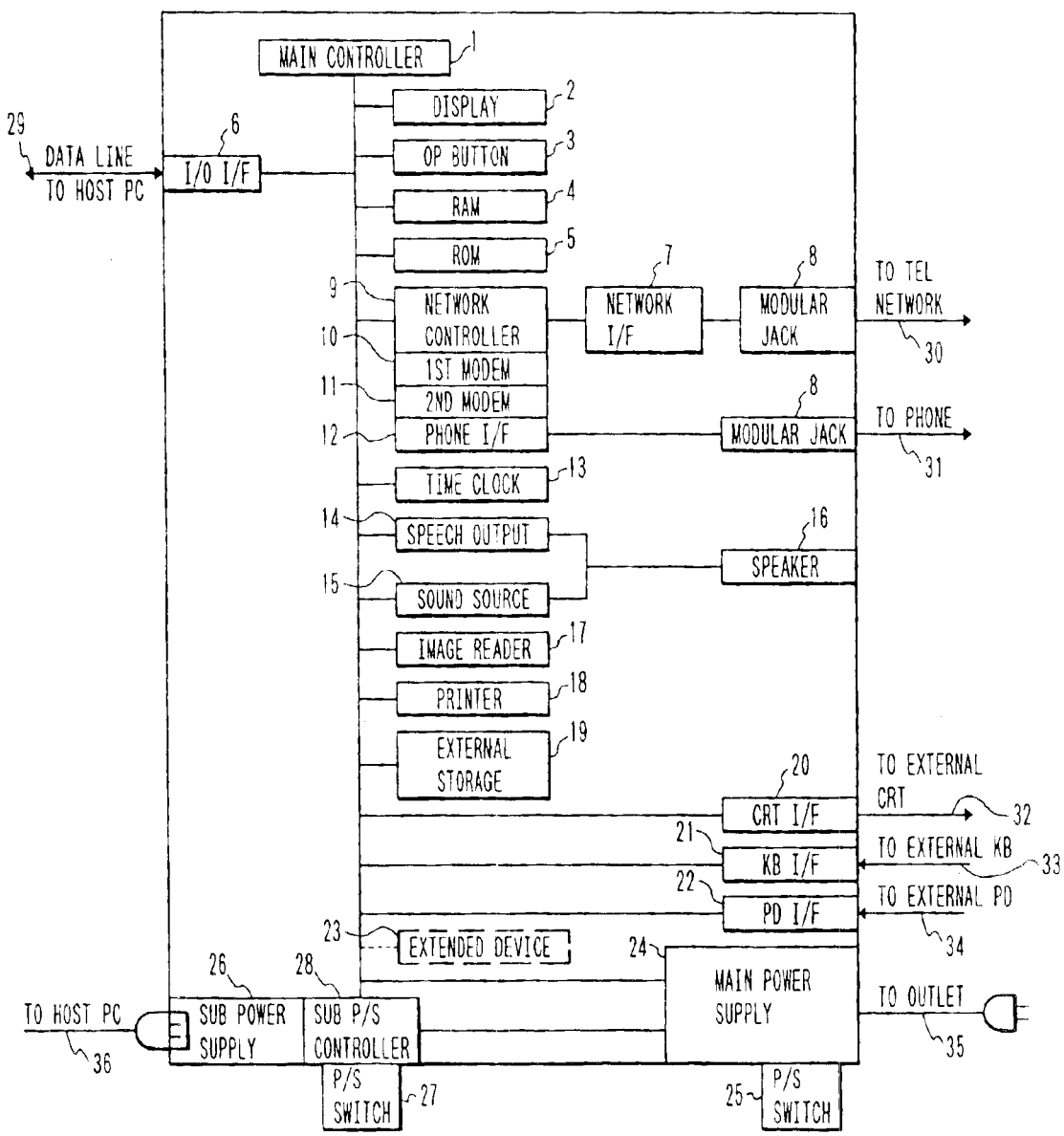
FIG. 1 is a block diagram for explaining a construction of a compound peripheral device showing the first embodiment of the invention.

FIG. 1 is a block diagram for explaining a construction of a compound peripheral device showing the first embodiment of the invention.

In the diagram, reference numeral 1 denotes a main controller to control the whole peripheral device of a computer having a plurality of devices; 2 indicates a display; 3 an operation button which is used as an input device by the operator when executing an initialization of the peripheral device of the embodiment, an operation when the device is used, an instruction, or the like; 4 an RAM which stores exchangeable data, a control program, a printer program, and the like and which functions as a readable/writable internal memory device; 5 an ROM which stores constants and fixed data which have previously been prepared, a preregistered control program, a fundamental application, and the like and which functions as a read only internal memory device; and 6 an input/output (I/O) interface for interfacing data with a host computer (not shown). Reference numeral 7 denotes a network interface which functions as a circuit to execute a speech communication through an external communication network and to perform a data exchange of facsimile data, digital information, or the like; 8 a modular jack to connect a line to a network or a telephone; 9 a network controller to control the transmission and reception between an external communication network and the internal device; 10 a first modem for perform a code conversion and a reproduction when exchanging facsimile image information through the external communication network; 11 a second modem for performing a code conversion and a reproduction when exchanging digital data through the external communication network; 12 a phone interface; 13 a time clock which is used for a time stamp for connecting a commercially available telephone, a handset, or the like to the external network and enabling them to be used, a time waiting of an internal software, or a time designating operation; 14 a speech output unit which is constructed by an ADPCM or the like for sampling audio data into digital data or reproducing the sampled audio data; 15 a sound source which is constructed by an FM sound source circuit for handling information such as melody, tune, or the like as digital data and reproducing; and 16 a speaker to generate a sound on the basis of the sound information reproduced by the speech output unit 14 and sound source 15. Reference numeral 17 denotes an image reader which is used for an original reading facsimile transmission, an original reading copy, an image input device of the host computer, or the like as an application of the peripheral device according to an embodiment of the invention, namely, which is used for scanning image information and for reading as digital data. Reference numeral 18 denotes a printer for outputting character information, image information, figure information, or the like onto a recording medium as an output device of the copy, reception facsimile original, or host computer. Reference numeral 19 denotes an external storage such as floppy disk, hard disk (HD), IC card, or the like for storing a program main body, document data, image information, audio information, or the like which is handled by the computer. Reference numeral 20 denotes an external CRT interface for connecting a CRT for a computer to the peripheral device of the embodiment so as to display further detailed information or to enable the display data to be further easily seen or to enable the peripheral device to be used like a personal computer (PC). Reference numeral 21 denotes an external keyboard interface to connect a keyboard for a computer to the peripheral device of the embodiment so as to enable the peripheral device to be further easily operated and to enable the peripheral device to be used in a manner similar to the personal computer (PC). Reference numeral 22 denotes an external pointing device interface for connecting a pointing device such as mouse or track ball for a computer to the peripheral device of the embodiment so as to enable the peripheral device to be further easily operated and to enable the peripheral device to be used in a manner similar to the personal computer (PC). Reference numeral 23 denotes an extended device such as video disk moving image interface, interface for connection with an LAN, or the like which can be attached as an option later; 24 a main power supply of the peripheral device of the embodiment; 25 a main power supply switch to designate the on/off operation of the main power supply of the peripheral device of the embodiment; 26 a sub power supply for supplying a power source from the peripheral device of the embodiment to the outside (host computer which is connected is mainly used as a target); 27 a sub power supply switch to manually designate the on/off operation for supplying a power source from the sub power supply to the outside; 28 a sub power supply controller to control the on/off operation for supplying the power source from the sub power supply to the outside by the designation from the main controller 1; 29 a data line which is used to exchange data of the host computer which is connected to the peripheral device of the embodiment; 30 a connection line to an external network such as a public telephone network or the like; 31 a connection line to a telephone or the like which is connected to the outside; 32 a connection line to the CRT or the like which is connected to the outside; 33 a connection line to the keyboard or the like which is connected to the outside; 34 a connection line to the pointing device or the like which is connected to the outside; 35 a power supply line to the peripheral device of the embodiment; and 36 a power supply line to the host computer which is connected to the outside.

In the compound peripheral device constructed as mentioned above, on the basis of a selection execution instruction by the operation button 3, the main controller 1 reads out and executes either one of the application programs which was down loaded into memory means from the server computer and controls the driving of either one of the foregoing function processing means. Therefore, the function processes of the compound peripheral device can be freely expanded.

Since the memory means is constructed by the RAM 4, only the necessary application can be down loaded.

Further, when the memory means is constructed by the external storage 19, a plurality of applications can be simultaneously down loaded.

Since either one of the application programs which is down loaded from the server computer is selected and designated by an instruction from the operation button 3, only the desired application can be down loaded.

Further, since the network controller 9 reads out either one of the application programs stored in the RAM 4 and transfers to another compound peripheral device through a predetermined communication line, either one of the applications can be also relayed and transferred to the compound peripheral device which doesn't have the communication function with the server computer.

On the basis of the selection execution instruction by the operation button 3, the main controller 1 reads out and executes either one of the application programs which was down loaded in the RAM 4 from the host computer and controls the driving of either one of the function processing means. Therefore, the function of each function processing means can be cheaply added and expanded by using a simple network.

Further, since the memory means is constructed by the RAM 4, only the necessary application can be down loaded.

When the memory means is constructed by the external storage 19, a plurality of applications can be simultaneously down loaded.

Further, since the operation button 3 selects and designates either one of the application programs to be down loaded from the RAM, only a desired application can be down loaded.

Since the operation button 3 previously designates either one of the application programs to be down loaded from the host computer, the transfer control of the designated application program from the host computer can be simplified and the designated application can be efficiently down loaded.

Further, on the basis of the selection execution instruction by the operation button 3, either one of the application programs read out from the external storage 19 is loaded and stored into the RAM 4. The program executing means executes the loaded application and controls the driving of either one of the function processing means. Therefore, even in the case where the memory capacity of the RAM 4 is small, while a plurality of necessary applications are down loaded in a lump, the necessary application can be selected and each function process can be efficiently executed.

The main controller 1 analyzes a combination function instruction state by the operation button 3 and combines and sequentially reads out each of the applications stored in the memory means and controls the combination driving of the function processing means. Therefore, an advanced compound function process in which various kinds of function processes are combined can be executed.

Further, the main controller 1 exclusively controls the start of the execution of the designated combination function process while judging the present use state of each of the printer, scanner, and the like which analyze the combination function instruction state by the operation button 3 and execute the combination function process. Therefore, the combination function process and each function process can be efficiently executed while avoiding the competition between the combination function process and each function process.

Since the main controller 1 informs the present use state of each function processing means which was judged, the competition state of the combination function process and each function process can be certainly informed to the user.

Figure 2:
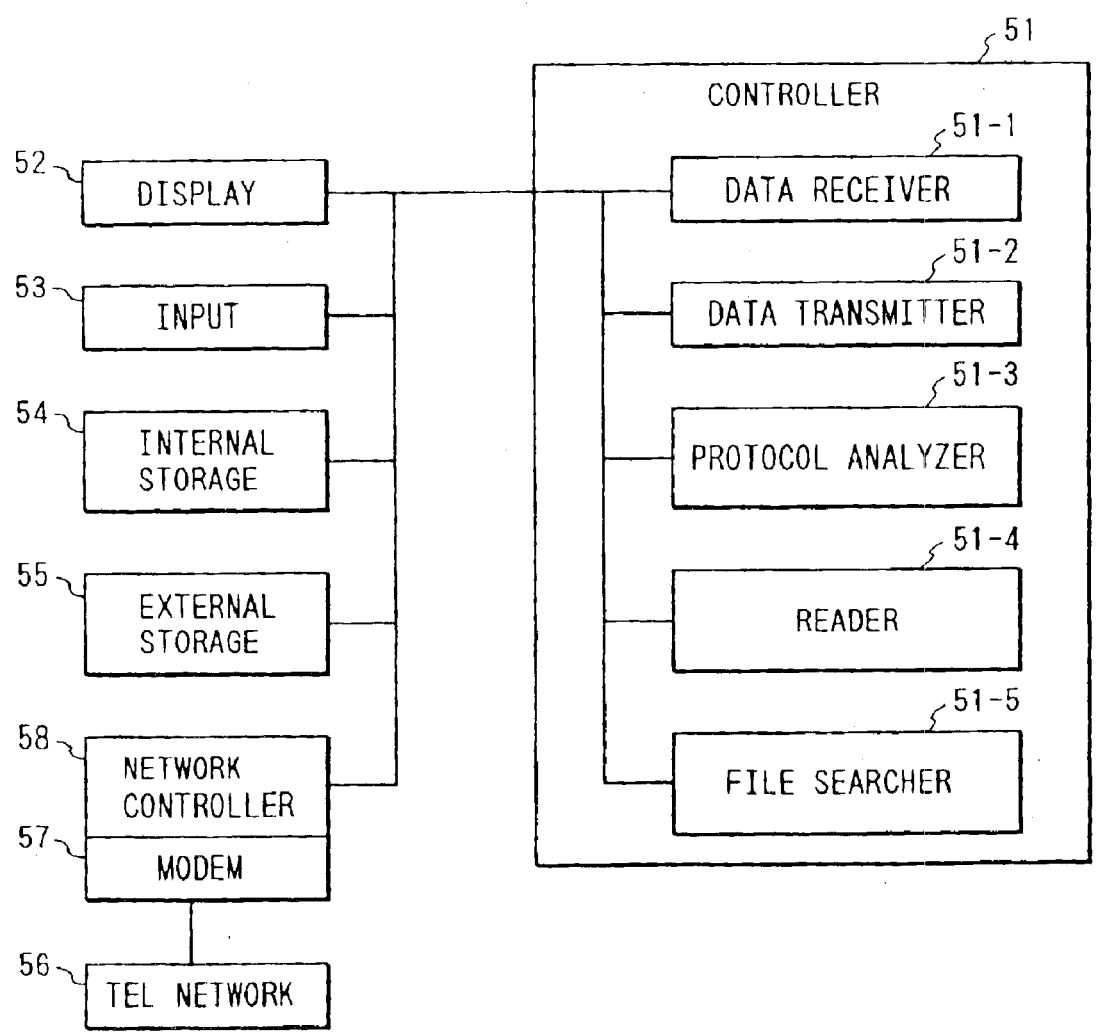
FIG. 2 is a block diagram for explaining a system construction of a server computer for communicating with the compound peripheral device shown in FIG. 1.

FIG. 2 is a block diagram for explaining a system construction of a server computer which communicates with the compound peripheral device shown in FIG. 1.

In the diagram, reference numeral 51 denotes a controller comprising: a data receiver 51-1; a data transmitter 51-2; a protocol analyzer 51-3; a reader 51-4; a file searcher 51-5; and the like.

Reference numeral 52 denotes a display which is constructed by, for example, a CRT display; 53 an input device comprising, for example, a keyboard and a pointing section or the like; 54 an internal storage comprising an RAM or the like; 55 an external storage comprising a floppy disk, a hard disk (HD), or the like; 56 a telephone network which is connected to a modem 57; and 58 a network controller to control the connection/disconnection with/from the telephone network 56.

Figure 3:
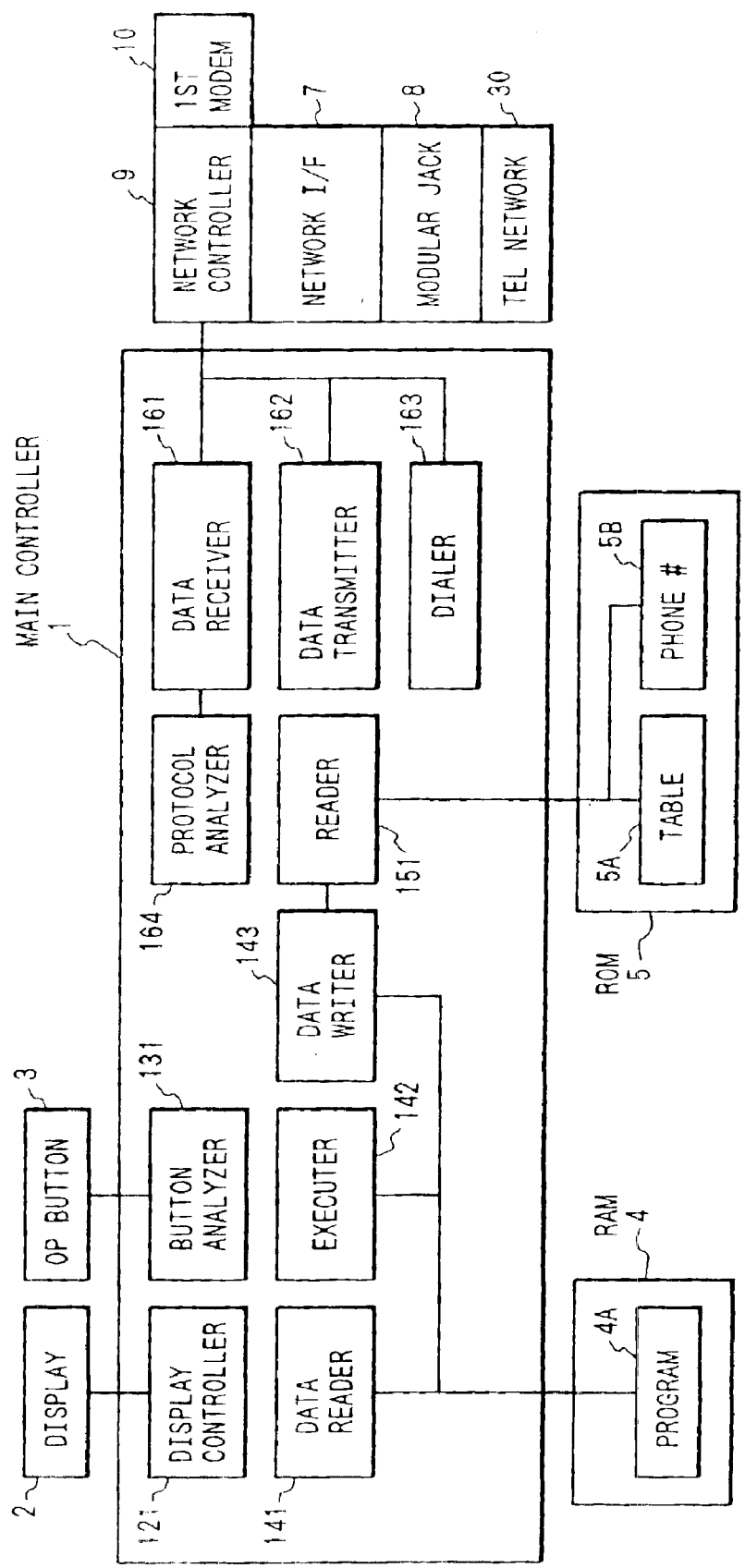
FIG. 3 is a block diagram for explaining a detailed construction of a main controller 1 shown in FIG. 1.

FIG. 3 is a block diagram for explaining a detailed construction of the main controller 1 shown in FIG. 1 and the same portions as those shown in FIG. 1 are designated by the same reference numerals.

In the diagram, reference numeral 121 denotes a display controller to control the display to the display 2; 131 a button analyzer to control the input from the operation button 3; 141 a data reader to control the reading operation of data from the RAM 4; 142 an executer to execute the program or the like stored in the RAM 4; 143 a data writer to control the writing operation of data or the like into the RAM 4; 151 a reader to read out the program or data stored in the ROM 5; 161 a data receiver to receive data from the server computer; 162 a data transmitter to transmit data to the server computer; 163 a dialer; and 164 a protocol analyzer to analyze a protocol.

Reference numeral 4*a* denotes a program storage area, 5*a* a program management table, and 5*b* a phone number storage area of the server computer.

The activation processing operation in the compound peripheral device according to the invention will now be described hereinbelow with reference to a flowchart shown in FIG. 4.

Figure 4:
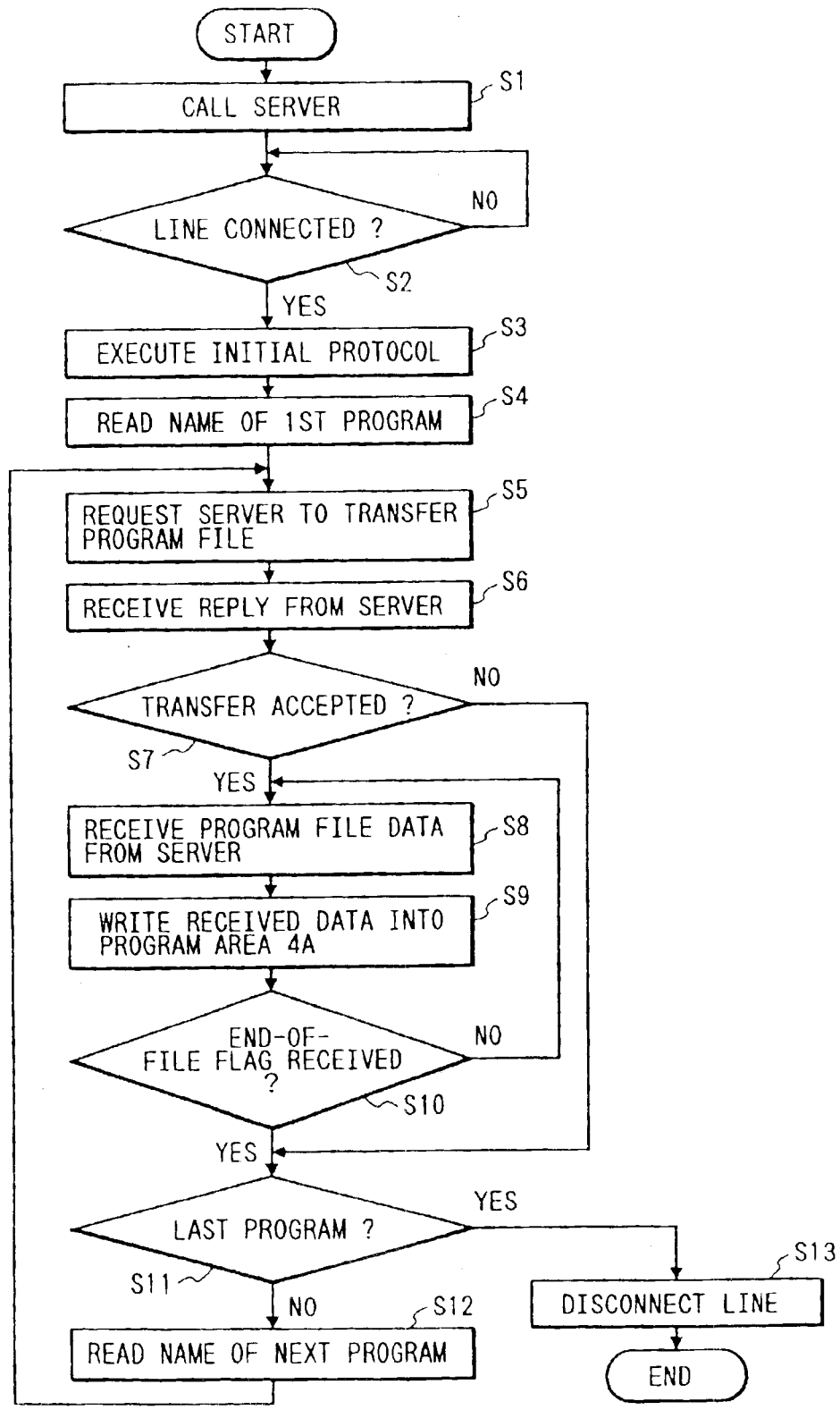
FIG. 4 is a flowchart showing an example of an activation processing procedure in the compound peripheral device according to the invention.

FIG. 4 is a flowchart showing an example of an activation processing procedure in the compound peripheral device according to the invention. S1 to S13 denote processing steps.

First, when it is now assumed that the power supply is turned on and the peripheral device is activated, the reader 151 reads the telephone number of the server computer from the phone number storage area 5b and the dialer 163 dials the telephone number and makes a telephone call (step S1). The apparatus waits until the network is connected (S2). When the network is connected, the protocol analyzer 164 executes an initial protocol by using the data transmitter 162 and the data receiver 161 (S3). After completion of the initial protocol, the reader 151 reads the name of the first program to be loaded into the peripheral device from the program management table 5a in the ROM 5 (S4). The data transmitter 162 transmits a request for transfer of such a program name file to the server computer (S5). In accordance with the transfer request, the data receiver 161 receives an acknowledgement for the transfer request from the server computer (S6). A check is made to see if the acknowledgement indicates an acceptance of the transfer or not (S7). If NO, step S11 follows. If YES, the data receiver 161 waits for the transfer of the data of the program file from the server computer (S8). When the data transfer of the program file is received, the data writer 143 sequentially writes the programs into the program storage area 4a in the RAM 4 (S9). Subsequently, a check is made to see if a flag indicative of the end of file exists in the data received by the data receiver 161 or not (S10). If NO, the processing routine is returned to step S8. If YES, a check is made to see if the program is the last program or not (S11). If YES, the network controller 9 disconnects the telephone network (S13). The processes on the peripheral device side are finished.

If NO in step S11, the name of the next program is read out from the program management table 5a (S12). The processing routine is returned to step S5 and the above processes are repeated.

Figure 5:
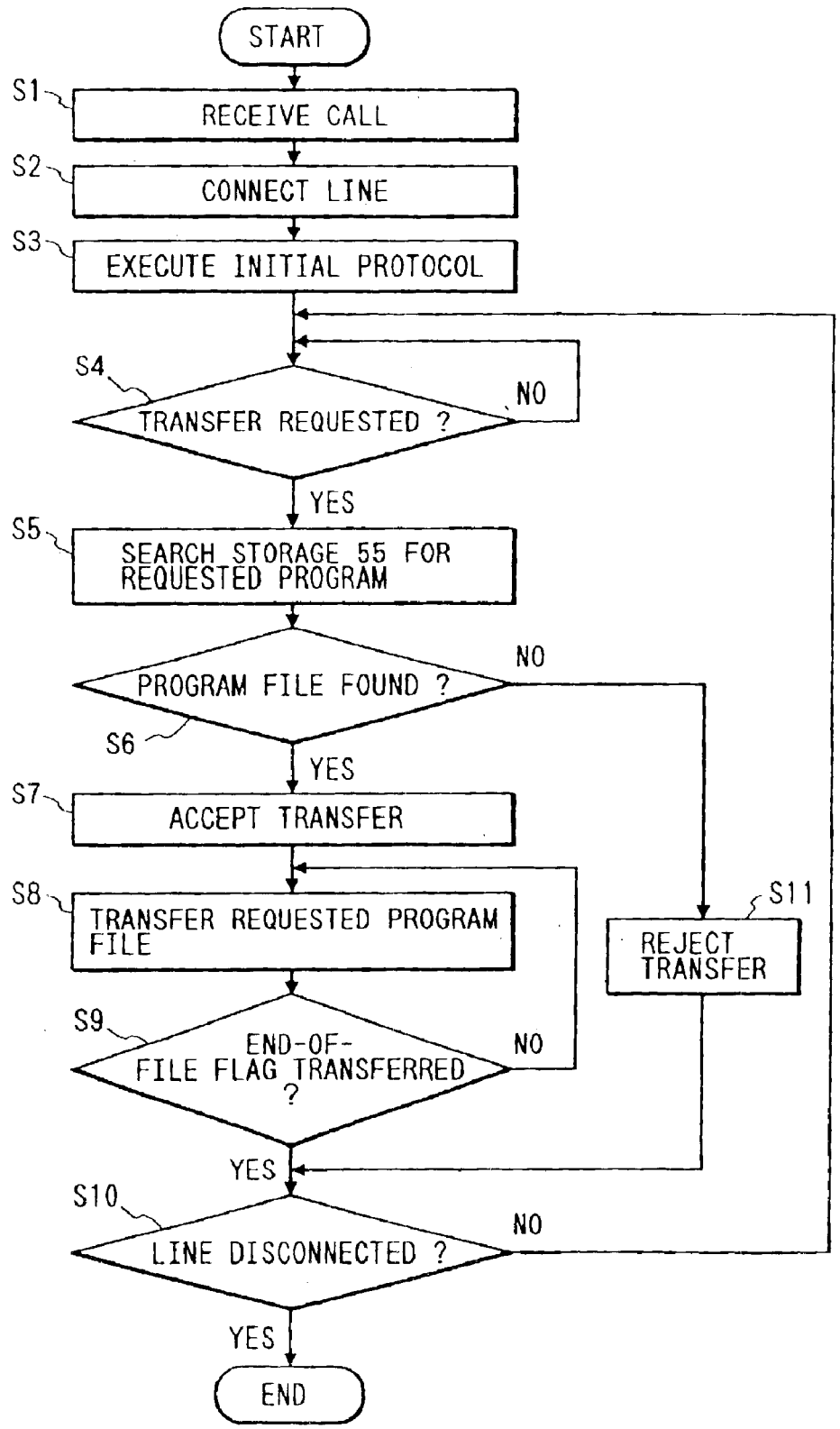
FIG. 5 is a flowchart showing an example of an activation processing procedure on the side of the server computer which is connected to the compound peripheral device according to the invention.

FIG. 5 is a flowchart showing an example of an activation processing procedure on the server computer side which is connected to the compound peripheral device according to the invention. S1 to S11 indicate processing steps.

In each step, there is a program which resides in the internal storage 54 of the server computer and is operating. Each means in the controller 51 executes the processes in the program.

First, when there is a telephone call (S1), the network controller 58 connects the line (S2). The protocol analyzer 51-3 executes the initial protocol (S3). After that, the data receiver 51-1 waits for a transfer request from the peripheral device (S4). When the transfer request is received, the file searcher 51-5 searches the name of the program sent with respect to the request from the external storage 55 (S5). A check is made to see if the requested program file has been found or not (S6). If NO, a rejection of the transfer is sent to the peripheral device (S11). The processing routine is returned to step S10.

If YES in step S6, the data transmitter 51-2 sends a transfer acceptance to the peripheral device (S7). The reader 51-4 reads out the requested program file from the external storage 55 and the data transmitter 51-2 transfers the data to the peripheral device (S8). A check is made to see if the flag indicative of the end of file has been transferred or not (S9). If NO, the processing routine is returned to step S8 and the apparatus again waits for the transfer request. If YES, a check is made to see if the network has been disconnected or not (S10). If NO, the processing routine is returned to step S4. If YES, the processes are finished.

Upon execution of the program, when the button analyzer 131 recognizes that one application or either one of a plurality of applications has been designated by the operation button 3 of the input section and that the execution switch has been depressed, the data reader 141 executes the designated program from the program storage area 4a in the RAM 4.

Figure 6:
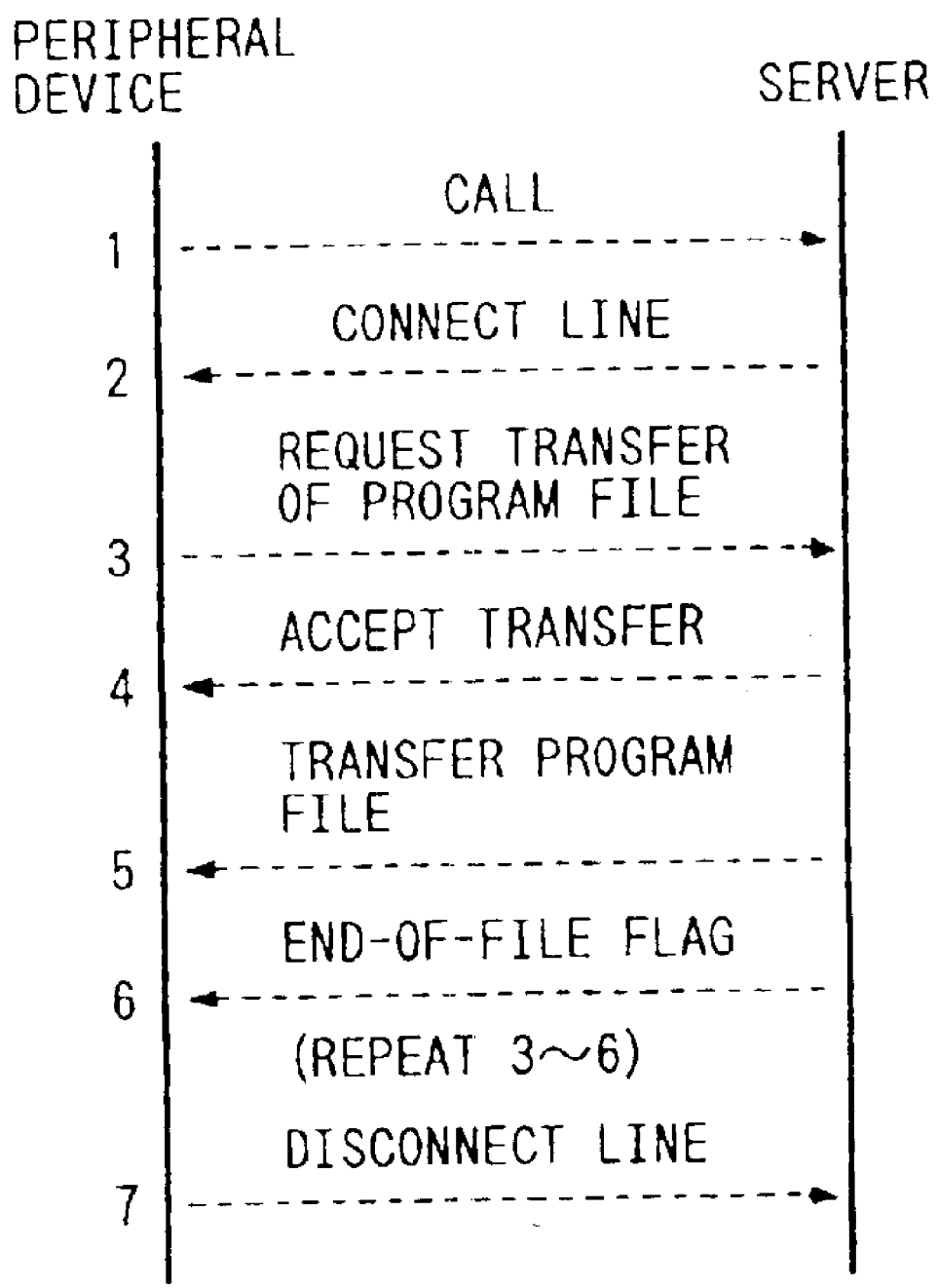
FIG. 6 is a diagram showing the first communication protocol between the compound peripheral device shown in FIG. 1 and the server computer.

FIG. 6 is a diagram showing the first communication protocol between the compound peripheral device shown in FIG. 1 and the server computer.

As shown in the diagram, by executing the communication process, the process upon activation between the peripheral device and the server computer is executed and a desired program is executed.

In the embodiment, as a destination in the peripheral device into which the application program which is transferred and loaded from the server computer is stored, the external storage 55 can be also used in place of the RAM 4. In this case, upon execution of the program, when the button analyzer 131 recognizes that one application program or either one of a plurality of application programs has been designated by the operation button 3 of the input section and that the execution switch has been depressed, the designated program is read out from among a plurality of programs. The data reader 141 reads out the designated program from the programs written in the external storage 55 and executes the designated program from the program storage area 4a in the RAM 4.

Figure 7:
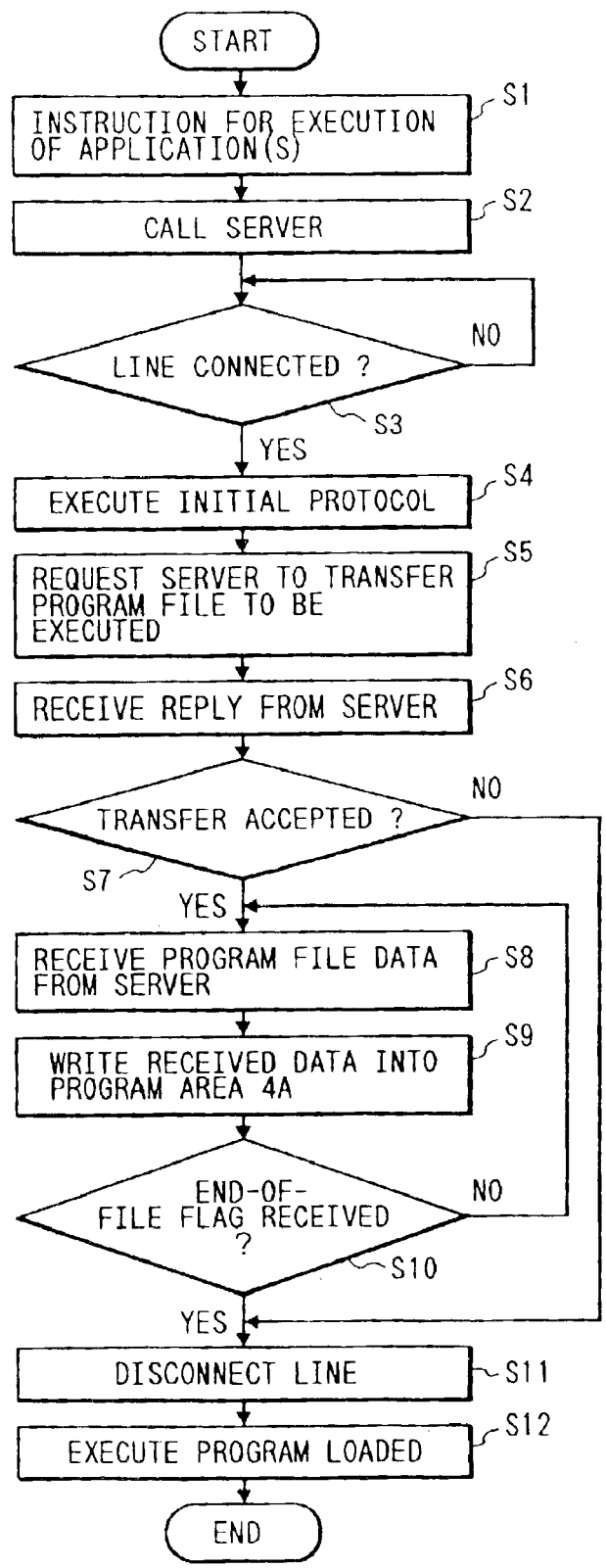
FIG. 7 is a flowchart showing an example of an execution processing procedure of an application on the peripheral device side in the compound peripheral device according to the invention.

FIG. 7 is a flowchart showing an example of an application execution processing procedure on the peripheral device side in the compound peripheral device according to the invention. S1 to S12 indicate processing steps. The processes shown in the embodiment correspond to the processes on the peripheral device side when executing the application closed in the peripheral device.

First, when the button analyzer 131 recognizes that one application or either one of a plurality of applications has been designated by the operation button 3 and that the execution switch has been depressed (S1), the reader 151 reads the telephone number of the server computer from the phone number storage area 5b and the dialer 163 dials the telephone number and makes a telephone call (S2). When the line is connected (S3), the protocol analyzer 164 executes the initial protocol by using the data transmitter 162 and the data receiver 161 (S4). Subsequently, when the initial protocol is finished, the reader 151 reads the number of program to be executed from the program management table 5b in the ROM 5. When the data transmitter 162 sends a transfer request of the program name file to the server computer (S5), the data receiver 161 receives an acknowledgement from the server computer (S6). A check is made to see if the acknowledgement indicates the transfer acceptance or not (S7). If NO (the case where the transfer rejection is received), step S11 follows and in order to finish the processes without executing the program by transmitting a notification of the end of processes to the server computer, the line is disconnected.

If YES in step S7, the data receiver 161 waits for the data transfer of the program file from the server computer. When the data transfer is received (S8), the data writer 143 sequentially writes the programs into the program storage area 4a in the RAM 4 (S9). Subsequently, a check is made to see if the flag indicative of the end of file exists in the received data or not (S10). By such data, it is judged that all of the file contents of the requested program have been received, so that the network controller 58 disconnects the line (S11). The data reader 141 reads out the program written in the program storage area 4a in the RAM 4 and executes it (S12). The processing routine is finished.

Figure 8:
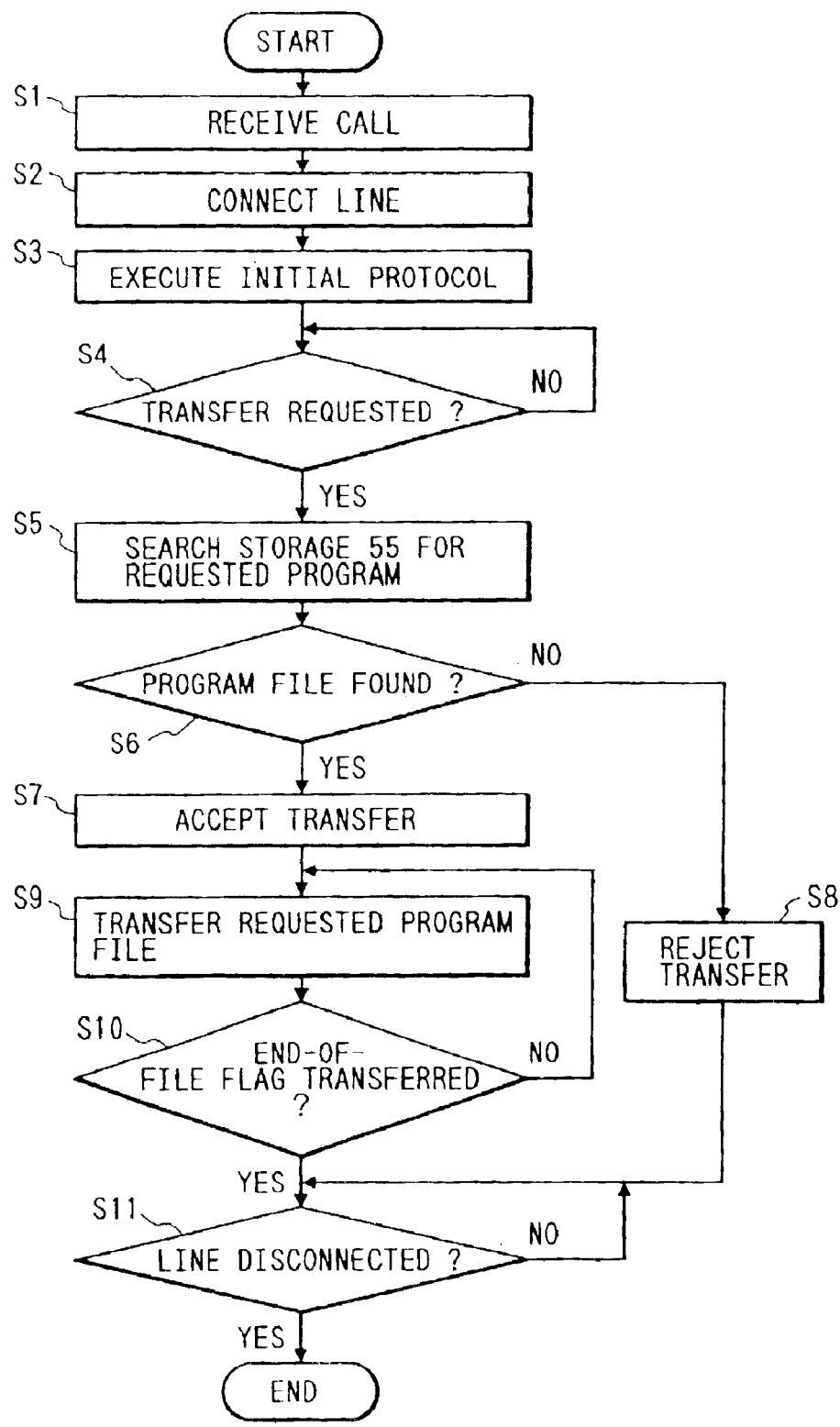
FIG. 8 is a flowchart showing an example of an execution processing procedure of an application on the server computer side in the compound peripheral device according to the invention.

FIG. 8 is a flowchart showing an example of an application execution processing procedure on the server computer side in the compound peripheral device according to the invention. S1 to S11 denote processing steps. Each means in the controller 51 executes the processes in the steps of the program which resides in the internal storage 54 of the server computer and which is being operated.

When there is a telephone call (S1), the network controller 58 connects the line (S2). The protocol analyzer 51-3 executes the initial protocol (S3). After that, the data receiver 51-1 waits for the transfer request from the peripheral device (S4). When the transfer request is received, the file searcher 51-5 searches the name of the program sent with respect to the request from the external storage 55 (S5). A check is made to see if the requested program file has been found or not (S6). If YES, the data transmitter 51-2 transmits the transfer acceptance to the peripheral device (S7). If NO, the transfer rejection is sent to the peripheral device (S8). The processing routine advances to step S11 and subsequent steps to wait for the notification of the end of processes from the peripheral device.

After the transfer acceptance was sent, the reader 51-4 reads out the contents of the requested program file in the external storage 55 and the data transmitter 51-2 transfers the data to the peripheral device (S9). Subsequently, a check is made to see if the flag indicative of the end of file has been transferred or not (S10). If NO, the processing routine is returned to step S9. If YES, the apparatus waits for the disconnection of the line (S11). When the line is disconnected, the processing routine is finished.

Figures 9, 13:
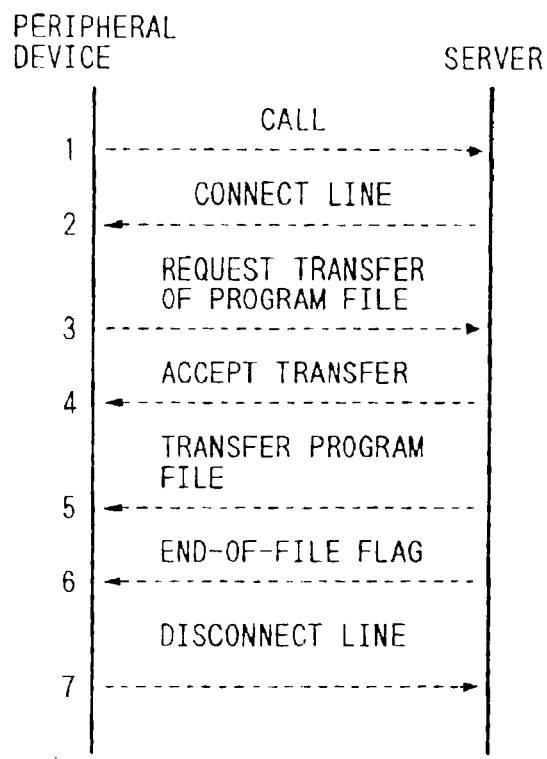
FIG. 9 is a diagram showing the second communication protocol between the compound peripheral device shown in FIG. 1 and the server computer.
FIG. 13 is a diagram showing an example of a program management table which is stored in a program management table storage area shown in FIG. 10.

FIG. 9 is a diagram showing the second communication protocol between the compound peripheral device shown in FIG. 1 and the server computer.

As shown in the diagram, by executing the communication process, the processes upon activation between the peripheral device and the server computer are executed and a desired program is executed.

Figure 10:
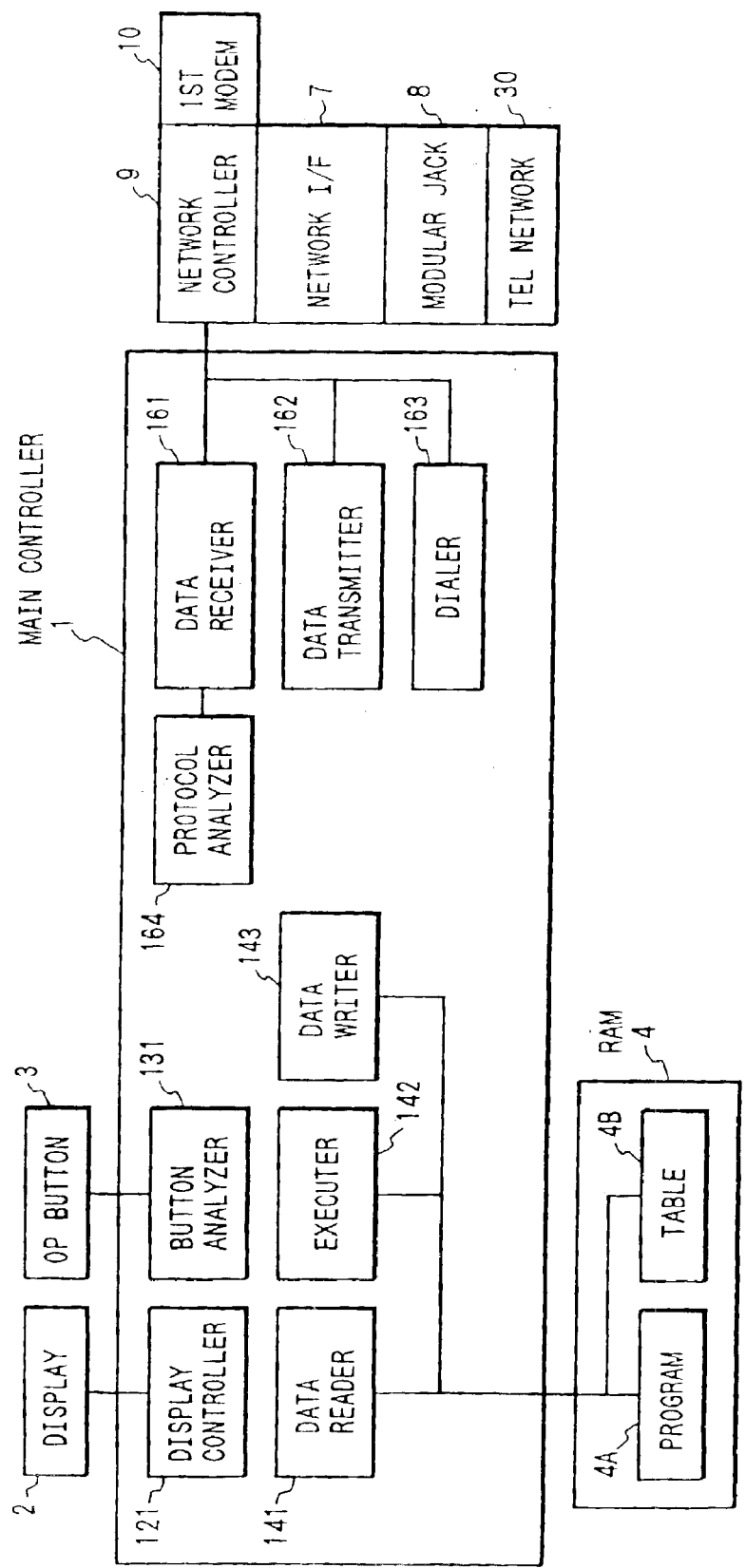
FIG. 10 is a block diagram for explaining another detailed construction of the main controller 1 shown in FIG. 1.

FIG. 10 is a block diagram for explaining another detailed construction of the main controller 1 shown in FIG. 1 and the same portions as those shown in FIGS. 1 and 3 are designated by the same reference numerals.

In FIG. 10, reference numeral 4b denotes a program management table storage area. In details, a program management table shown in FIG. 13 is stored in the storage area 4b. The telephone number of the peripheral device having the designated application program and the program number in the RAM of the terminal are stored in the storage area 4b.

An application execution processing operation on the peripheral device side in the compound peripheral device according to the invention will now be described hereinbelow with reference to a flowchart shown in FIG. 11.

Figure 11:
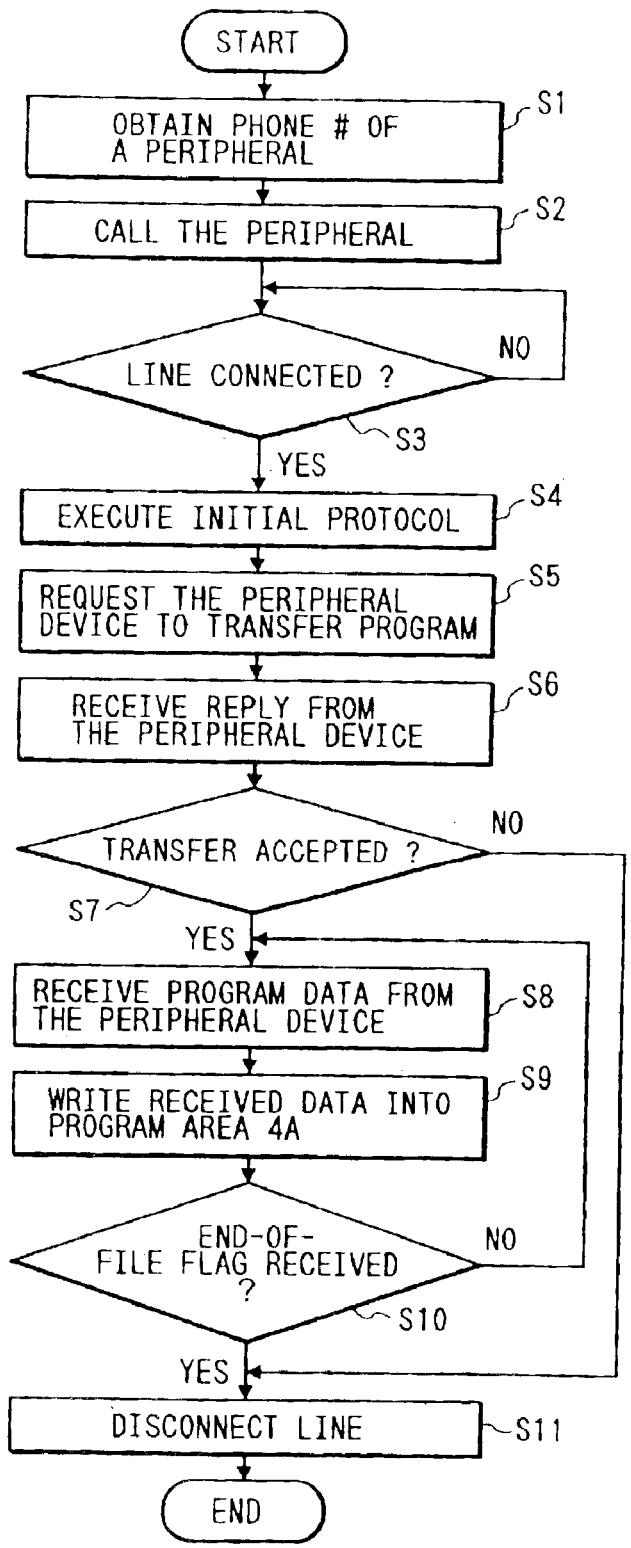
FIG. 11 is a flowchart showing an example of an execution processing procedure of the application on the peripheral device side in the compound peripheral device according to the invention.

FIG. 11 is the flowchart showing an example of the application execution processing procedure on the peripheral device side in the compound peripheral device according to the invention. S1 to S11 denote processing steps.

First, when the button analyzer 131 recognizes that one application or either one of a plurality of applications has been designated by the operation button 3 and that the execution switch has been depressed, the data reader 141 reads the program management table 4b in the RAM 4 and obtains the telephone number of the peripheral device having the designated application program and the program number in the RAM of the terminal (S1). Subsequently, the dialer 163 dials the telephone number and makes a telephone call (S2). When the line is connected (S3), the protocol analyzer 164 executes the initial protocol by the data transmitter 162 and the data receiver 161 (S4). When the initial protocol is finished, the data transmitter 162 designates the program number in the RAM and transmits a transfer request of the program file to a peripheral device on the partner side (S5). The data receiver 161 receives a response from the partner's peripheral device (S6). The data receiver 161 judges whether the received response indicates the acceptance of the transfer or not (S7). If NO, the processing routine advances to step S11 and subsequent steps. If YES, the data receiver 161 receives the data of the program file which is transferred from the partner's peripheral device (S8). When the data transfer is received, the received data is written into the program storage area 4a in the RAM 4 (S9). A check is made to see if the flag indicative of the end of the file exists in the received data or not (S10). If NO, the processing routine is returned to step S8. If YES, it is judged by the data that all of the contents of the file of the requested program have been received, so that the network controller 58 disconnects the telephone line (S11). The processing routine is finished.

Figure 12:
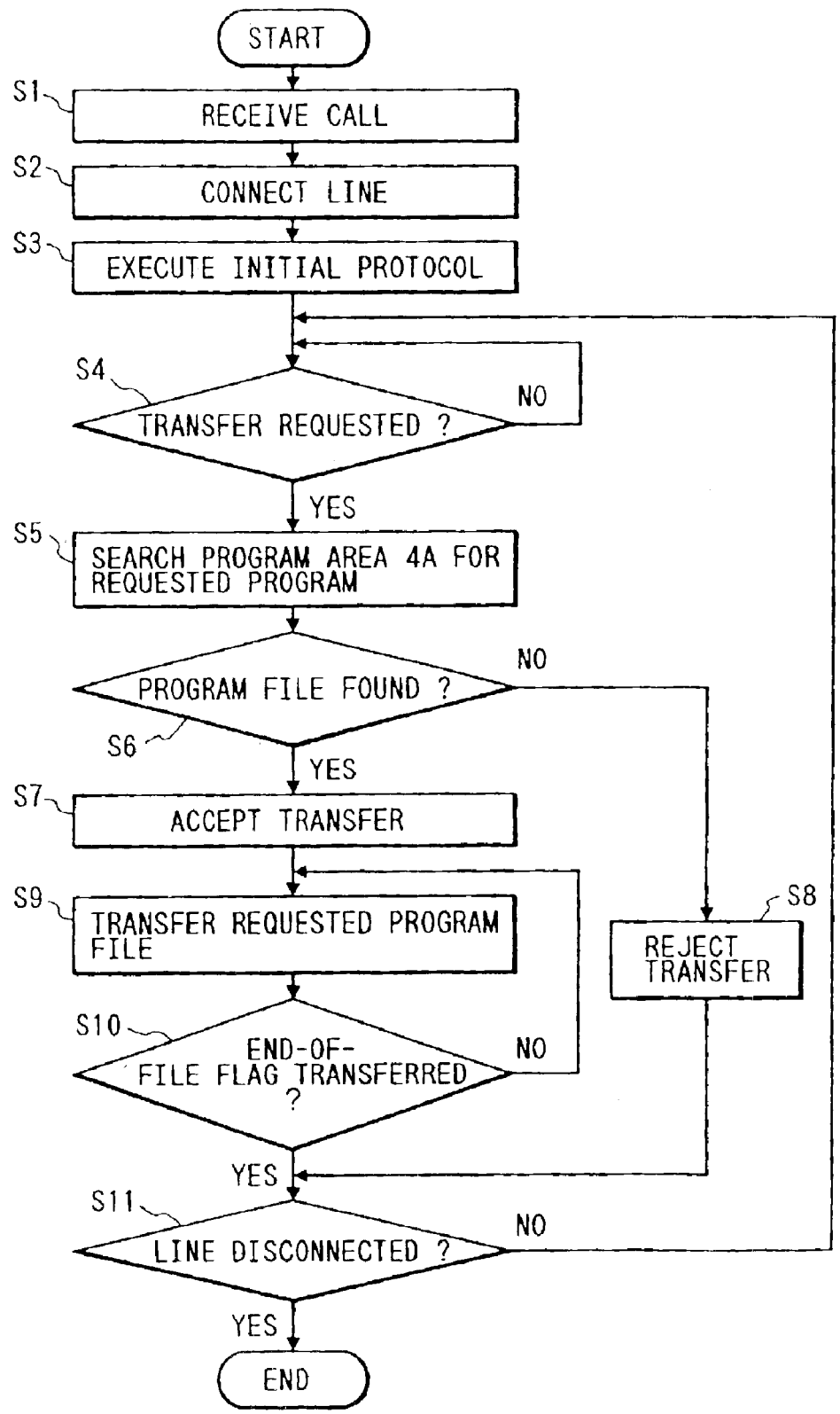
FIG. 12 is a flowchart showing an example of an execution processing procedure of the application on a program file transfer side in the compound peripheral device according to the invention.

FIG. 12 is a flowchart showing an example of an application execution processing procedure on the program file transfer side in the compound peripheral device according to the invention. S1 to S11 indicate processing steps.

When there is a telephone call (S1), the network controller 58 connects the line (S2). The protocol analyzer 164 executes the initial protocol (S3). Subsequently, the data receiver 161 waits for the transfer request from the peripheral device (S4). When the data receiver 161 receives the transfer request, the data reader 141 searches and reads out the program corresponding to the designated program number in the RAM (S5). A check is made to see if the designated program exists in the program storage area 4a in the RAM 4 or not (S6). If NO, the transfer rejection is sent to the partner's peripheral device (S8). The processing routine advances to step S11 and subsequent steps. If YES, the data transmitter 162 sends the transfer acceptance to the partner's peripheral device (S7). The data reader 141 reads out the contents of the requested program from the program storage area 4a and the data transmitter 162 transfers the data to the peripheral device (S9). A check is made to see if the flag indicative of the end of the data has been transferred to the last of the contents of the program or not (S10). If NO, the processing routine is returned to step S9. If YES, a check is made to see if a signal indicative of the disconnection of the line has been received from the peripheral device or not (S11). If NO, the processing routine is returned to step S4. If YES, the processing routine is finished.

[Second Embodiment]

Figure 14:
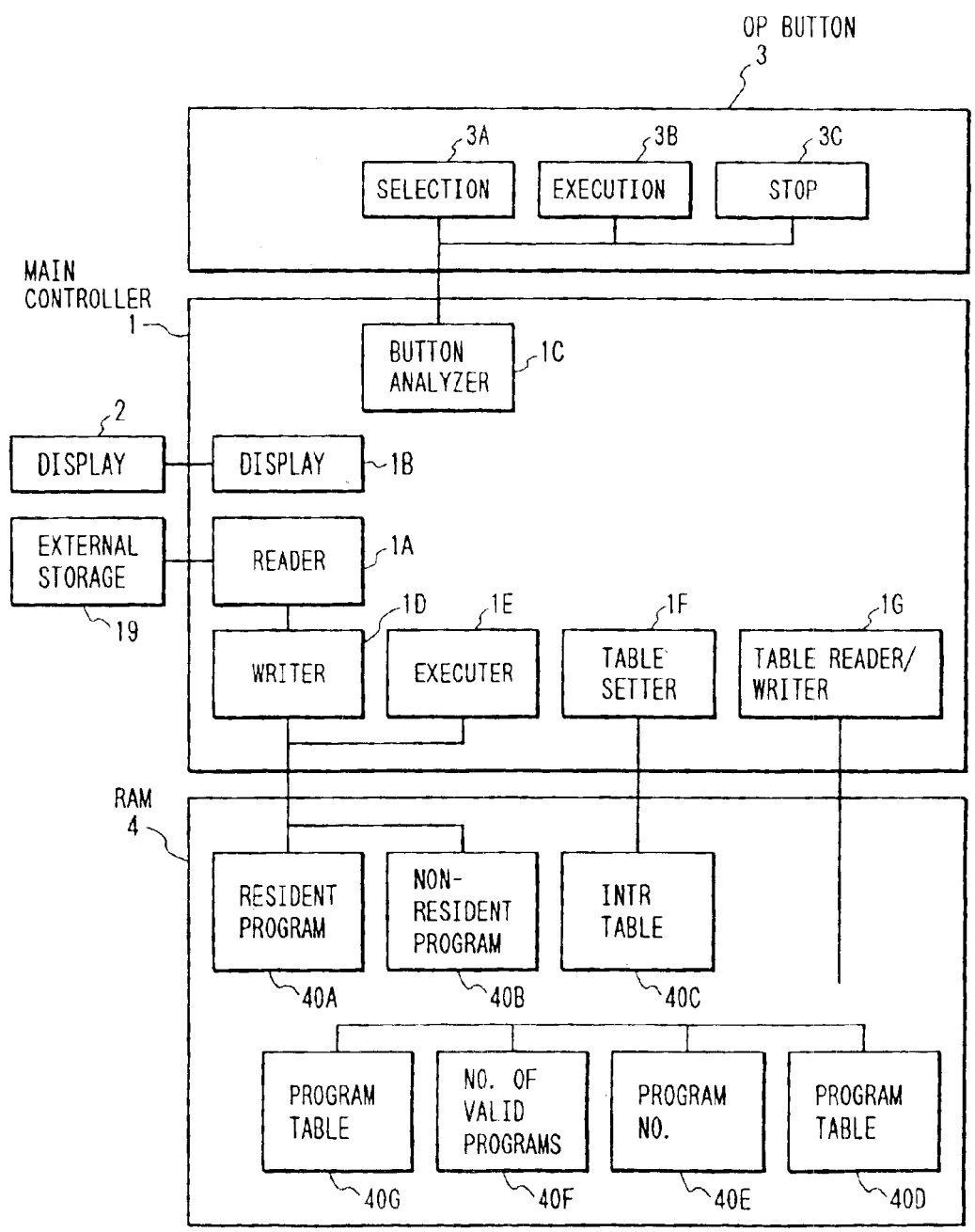
FIG. 14 is a detailed block diagram of a main section of the compound peripheral device showing the second embodiment of the invention.

FIG. 14 is a block diagram showing in detail a main section of a compound peripheral device showing the second embodiment of the invention and the same portions as those shown in FIG. 1 are designated by the same reference numerals.

In FIG. 14, reference numeral 1a denotes a reader to read out a file from the external storage 19; 1b indicates a display to display a program which is at present valid; 1c a button analyzer to recognize that the selection or execution of the program has been instructed from the operation button 3; 1d a writer to write the read-out program into the RAM 4; 1e an executer to execute the program written in the RAM 4; 1f a table setter to set an interruption table; and 1g a table reader/writer to read/write a program management table.

Reference numeral 3a denotes a selection switch which is depressed when instructing a program to be executed; 3b an execution switch which is depressed when executing the selected program; and 3c a stop switch which is depressed when stopping the execution of the program.

Reference numeral 40a denotes a resident program storage area; 40b a non-resident program storage area; 40c an interruption table storage area; 40d a program management table storage area; 40e a program number storage area; 40f a storage area to store the number of valid programs; and 40g a program management table storage area.

An activation processing operation in the compound peripheral device according to the invention will now be described hereinbelow with reference to a flowchart shown in FIG. 15.

Figure 15:
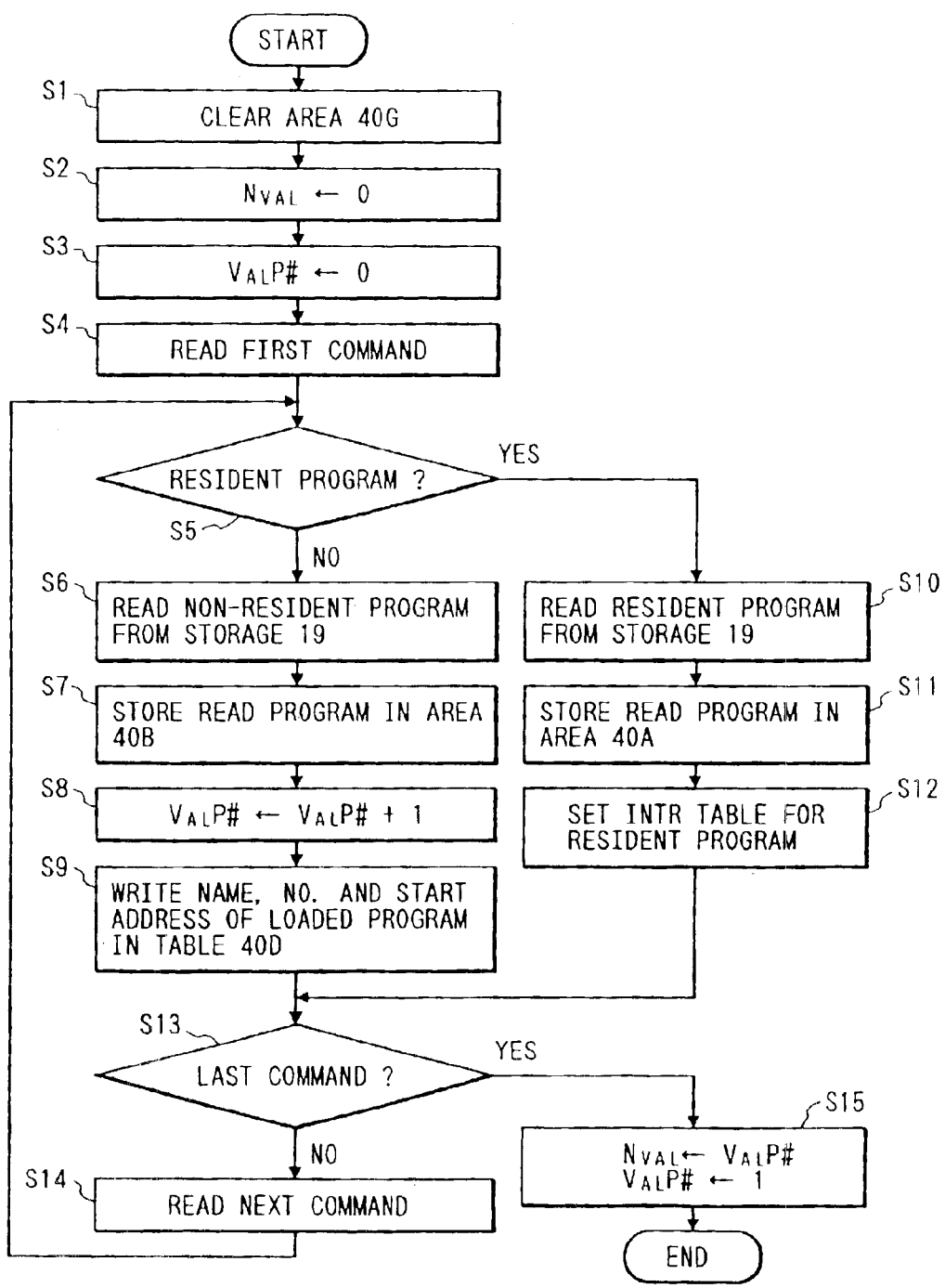
FIG. 15 is a flowchart showing an example of a processing procedure upon activation in the compound peripheral device according to the invention.

FIG. 15 is the flowchart showing an example of an activation processing procedure in the compound peripheral device according to the invention. S1 to S15 indicate processing steps.

First, the program management table storage area 40g is cleared (S1). The number ($N_{VAL}$) of valid programs which are stored into the No. of valid programs storage area 40f is reset to "0" (S2). Subsequently, the number ($V_{AL}P\#$) of the present valid program which is stored into the program No. storage area 40e is reset to "0" (S3). The reader 1a reads out the activation file from the external storage 19 and reads the first command in the file (S4). A check is made to see if the command is a loading command of the resident program or not (S5). If YES, the reader 1a reads out the designated resident program from the external storage 19 (S10). The writer 1d stores the read-out resident program into the resident program storage area 40a in the RAM 4 (S11). Subsequently, the table setter 1f sets an interruption table for the resident program. The processing routine advances to step S13 and subsequent steps.

When it is judged in step S5 that the command is the loading command of the non-resident program, the reader 1a reads out the non-resident program which was designated by the command from the external storage 19 (S6). The read-out non-resident program is stored into the non-resident program storage area 40b in the RAM 4 (S7). Further, the contents in the No. of valid programs storage area 40f to store the number of programs which are at present valid are increased by "1" (S8). The table reader/writer 1g sets the name of program loaded into the program management table 40d, the program No., and the start address (S9). In this manner, each time the non-resident program is loaded, the number of present valid programs is added with "1" at a time and a check is made to see if the processes for the last command have been finished or not (S13). If NO, the next command of the activation file is read (S14). The processing routine is returned to step S5 and the above processes are repeated. If YES, the reader/writer 1g substitutes the number of the present valid program stored in the program No. storage area 40e into the valid program No. which is stored into the No. of valid programs storage area 40f (S15). The processing routine is finished.

In the embodiment, upon execution of the programs, the resident program is executed at a time point when the designated interruption occurs and the execution of the non-resident program is instructed by the operation button 3. The name of the present valid program is displayed in the display 2.

FIG. 16 is a flowchart showing an example of a non-resident program execution processing procedure based on the selection switch 3a shown in FIG. 14. S1 to S4 indicate processing steps.

When the button analyzer 1c recognizes that the selection button 3a of the operation button 3 has been depressed, the reader/writer 1g reads the contents of the table (for instance, program management table shown in FIG. 17) in the program management table storage area 40d and the number of the present valid program which is stored into the program No. storage area 40e and discriminates whether the number of the present valid program coincides with the number of valid programs or not (S1). If YES, the No. of the present valid program is set into "1" (S3). The processing routine advances to step S4 and subsequent steps. If NO, the No. of the present valid program is increased by "+1" and the next program No. is set. When the No. of the present valid program coincides with the No. of the last program in the table, the first program No. is set into the No. of the present valid program (S2). The display 1b of the main controller 1 allows the name of the program of such a program No. to be displayed by the display 2 (S4).

After that, when the button analyzer 1c recognizes that the execution switch 3b has been depressed, the table reader/writer 1g reads the No. of the present valid program stored in the program No. storage area 40e and reads the start address of the program for the program No. and the executer 1e executes the program starting from the start address.

A case where at a time point when the exchangeable external storage is attached, the programs are read out from the external storage 19 and are loaded into the RAM 4 and a desired one of the loaded programs is selected and executed will now be described hereinbelow with reference to a flowchart shown in FIG. 18.

Figure 18:
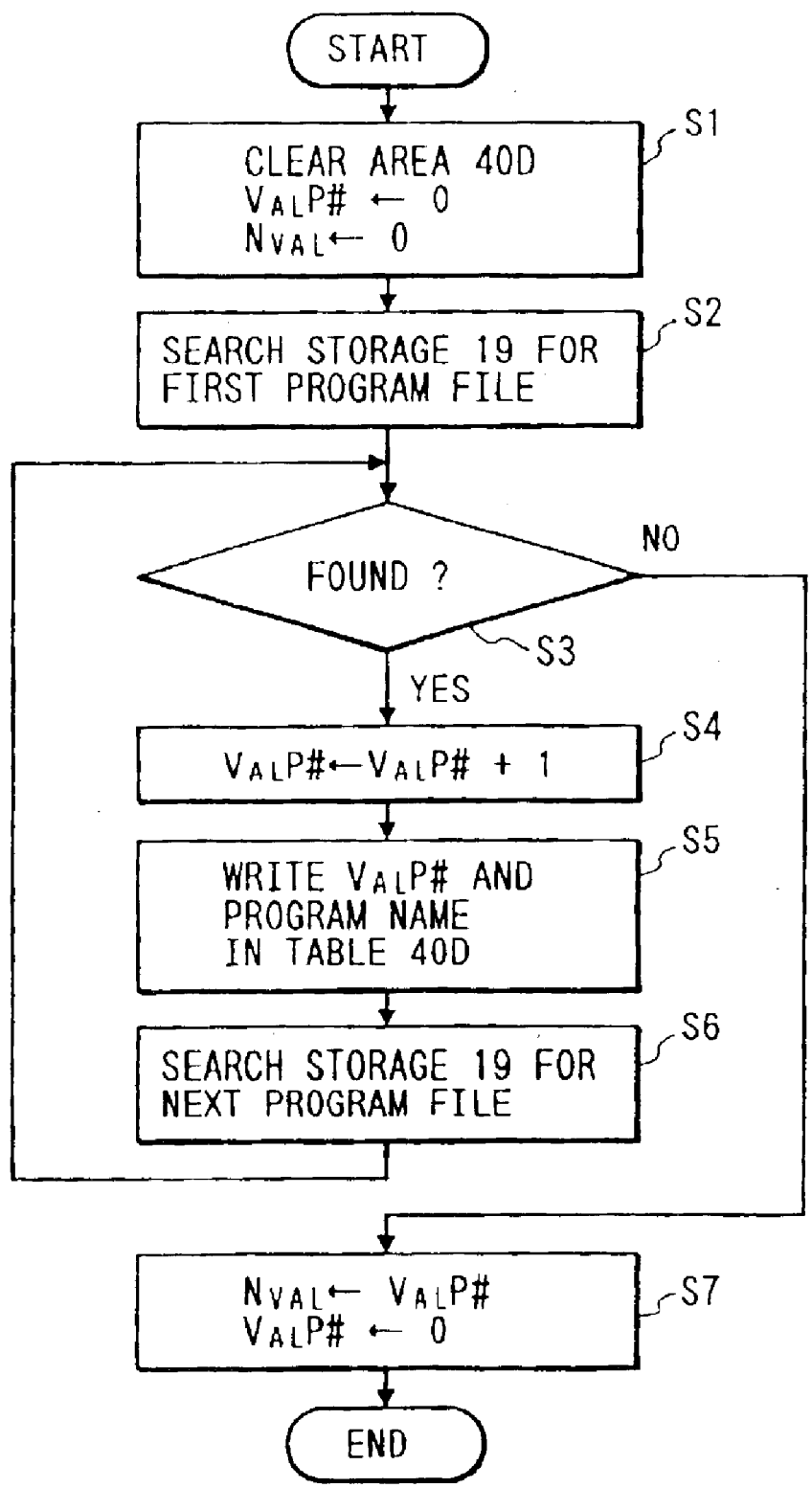
FIG. 18 is a flowchart showing an example of a loading processing procedure of the program in the compound peripheral device according to the invention.

FIG. 18 is the flowchart showing an example of a program load processing procedure in the compound peripheral device according to the invention. S1 to S7 indicate processing steps. When the external storing medium is set into the external storage 19, the table reader/writer 1g clears the program management table storage area 40d and the No. of the present valid program stored in the program No. storage area 40e and the number of valid programs which is stored into the No. of valid programs storage area 40f are reset to "0" (S1). The reader 1a subsequently searches the program file (S2). When the program file is found (S3), the No. of the present valid program stored in the program No. storage area 40e is increased by "+1" (S4). The reader 1a reads out the program No. and the program name written in the program and the table reader/writer 1g writes them into the program management table storage area 40d (S5). The search of the next program file from the external storage 19 is started (S6). The processing routine is returned to step S3.

On the other hand, if NO in step S3, namely, when the processes for the last program are finished, the table reader/writer 1g substitutes the No. of the present valid program stored in the program No. storage area 40e into the number of valid programs which is stored into the No. of valid programs storage area 40f and the No. of the present valid program stored in the program No. storage area 40e is reset to "0" (S7). The processing routine is finished.

The program selection and execution processing operations in the compound peripheral device according to the invention will now be described hereinbelow with reference to flowcharts shown in FIGS. 19A, 19B and 20.

Figure 19B:
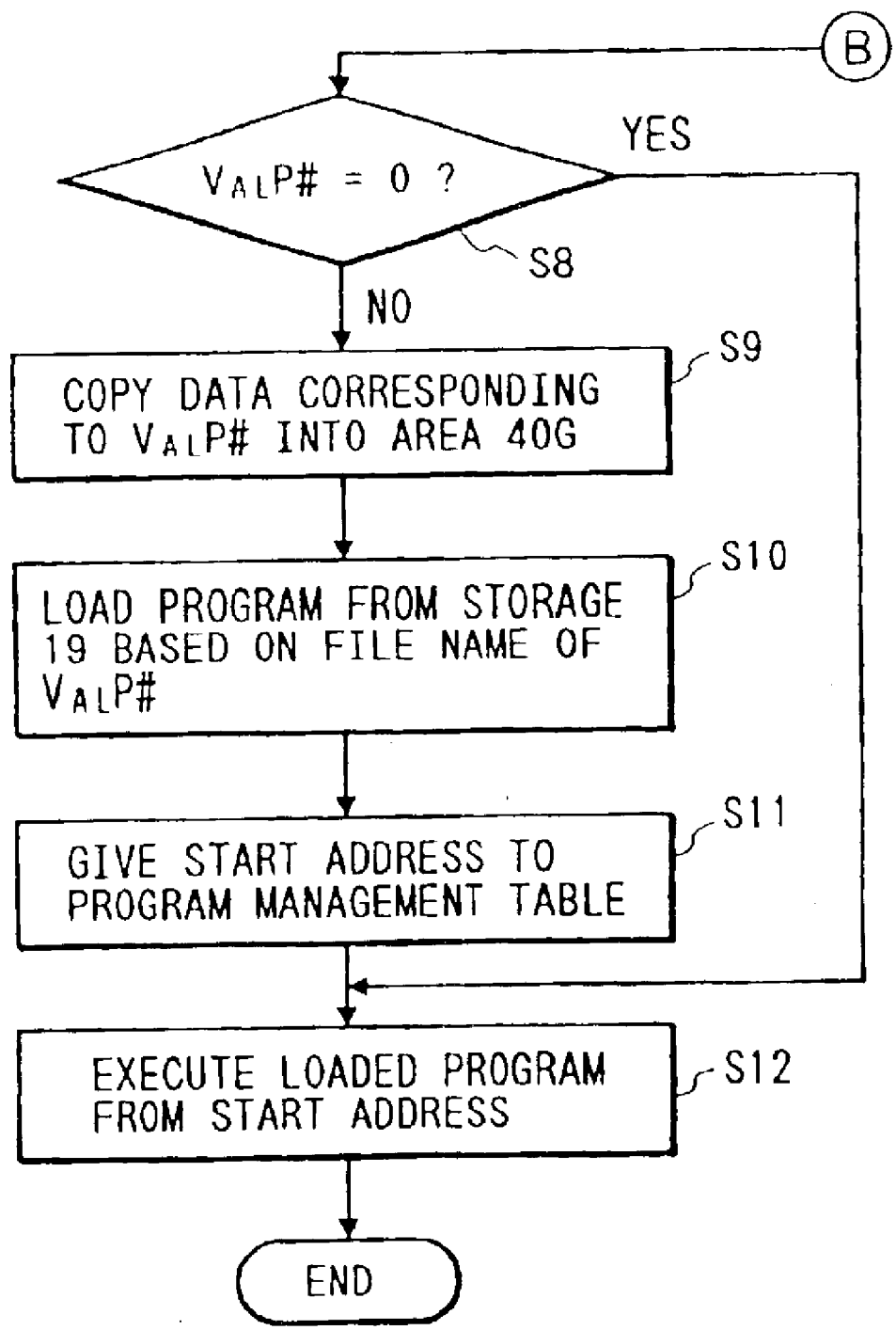
FIG. 19 is comprised of FIG. 19A and FIG. 19B showing flowcharts illustrating an example of a program selection/execution processing procedure in a compound peripheral device showing the second embodiment of the invention.

FIGS. 19A and 19B are flowcharts showing an example of a program selection/execution processing procedure in the compound peripheral device showing the second embodiment of the invention. S1 to S12 denote processing steps.

First, when the button analyzer 1c recognizes that the selection switch 3a of the operation button 3 has been depressed in a state in which the name of the present valid program is displayed in the display 2 (S1), step S3 follows. The table reader/writer 1g reads the contents of the table stored in the program management table storage area 40d and the present valid program No. which is stored into the program No. storage area 40e. A check is made to see if the present valid program No. coincides with the number of valid programs or not. If NO, the present valid program No. is added with "1" (the present valid program No. is set to the next program No.) (S4). The name of the program of the present valid program No. is read out from the program management table area and is displayed in the display 2 (S5). The processing routine is finished.

On the other hand, if YES in step S3 (when the present valid program No. is the last program No. in the table), the present valid program No. is set to "0" so as to indicate the loaded program (S6). The name of the loaded program is read out from the program management table 40g and the name of the program of the program No. is displayed in the display 2 by the display 1b of the main controller 1 (S7). The processing routine is finished.

On the other hand, if NO in step S1, a check is made to see if the execution switch 3b of the operation button 3 has been depressed or not (S2). If NO, the processing routine is returned to step S1. If YES, namely, when the button analyzer 1c recognizes that the execution switch 3b has been depressed, step S8 follows. The table reader/writer 1g reads the present valid program No. which is stored into the program No. storage area 40e and a check is made to see if the No. is equal to "0" or not (S8). If YES, namely, when it indicates the loaded program, step S12 follows and the executer 1c executes the program starting from the start address. The processing routine is finished.

Figures 20, 21, 26:
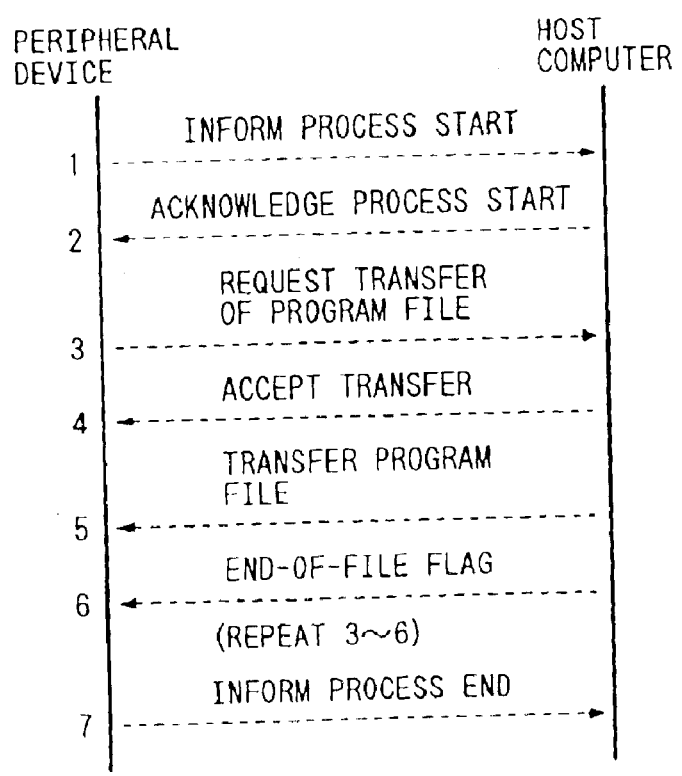
FIG. 20 shows an example of a program management table which is stored in the program management table storage area shown in FIG. 14.
FIG. 21 shows an example of a program management table which is stored in the program management table storage area shown in FIG. 14.
FIG. 26 is a diagram showing a communication protocol between the compound peripheral apparatus shown in FIGS. 22 and 23 and the host computer.

On the other hand, if NO in step S8, the table reader/writer 1g copies the data (corresponding to the present valid program No. stored in the program No. storage area 40e which is stored into the program management table storage area 40d, for example, in the program management table shown in FIG. 20) into the loaded program management table storage area 40g (S9). The program is loaded from the external storage 19 on the basis of the file name of the present valid program (S10). The start address is substituted into, for example, the program management table shown in FIG. 21 of the program management table storage area 40g (S11). The executer 1c executes the program starting from the start address. The processing routine is finished.

[Third Embodiment]

Figure 22:
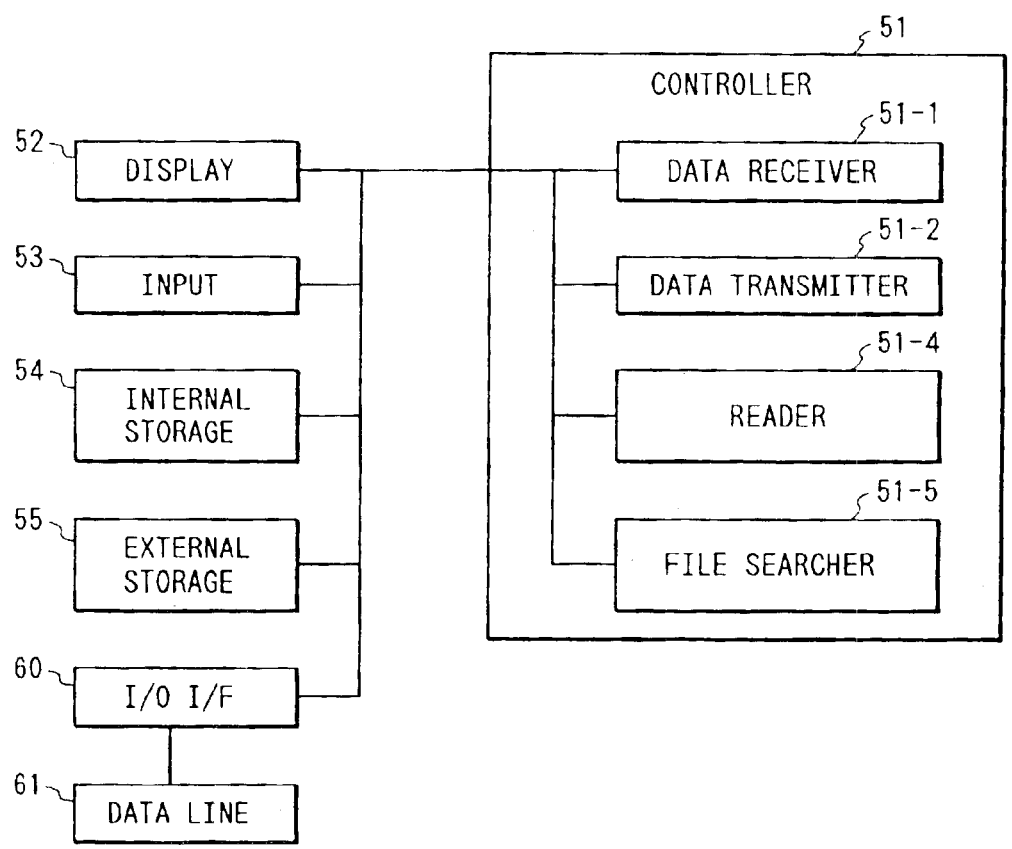
FIG. 22 is a block diagram for explaining a construction of a host computer which is connected to a compound peripheral device showing the third embodiment of the invention.

FIG. 22 is a block diagram for explaining a construction of a host computer which is connected to a compound peripheral device showing the third embodiment of the invention and the same portions as those shown in FIG. 2 are designated by the same reference numerals.

In FIG. 22, reference numeral 60 denotes an I/O interface which is connected to the compound peripheral device through a data line 61.

Figure 23:
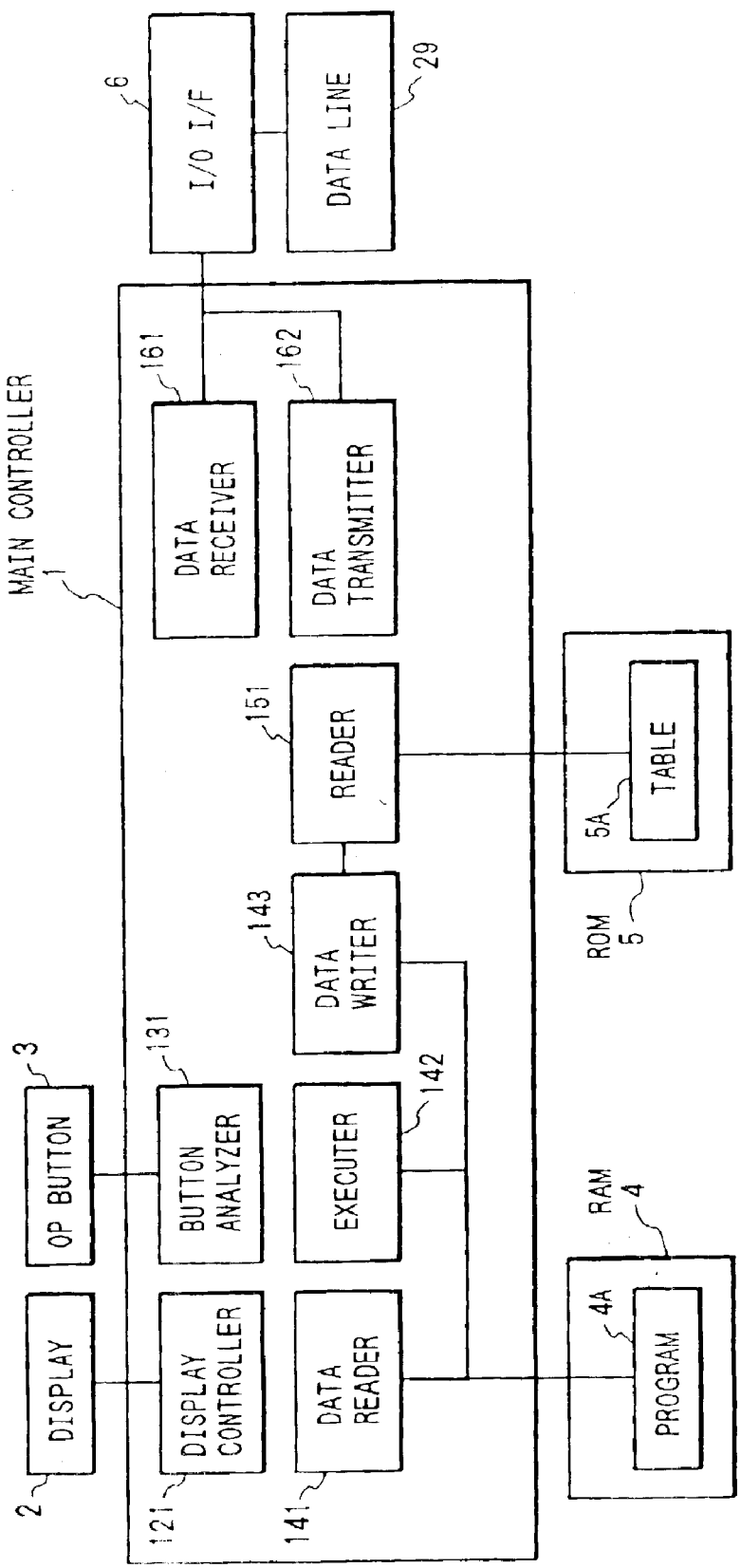
FIG. 23 is a block diagram for explaining a construction of the compound peripheral device showing the third embodiment of the invention.

FIG. 23 is a block diagram for explaining a construction of the compound peripheral apparatus showing the third embodiment of the invention and the same portions as those shown in FIG. 3 are designated by the same reference numerals.

An activation processing operation on the compound peripheral device side will now be described with reference to a flowchart shown in FIG. 24.

Figure 24:
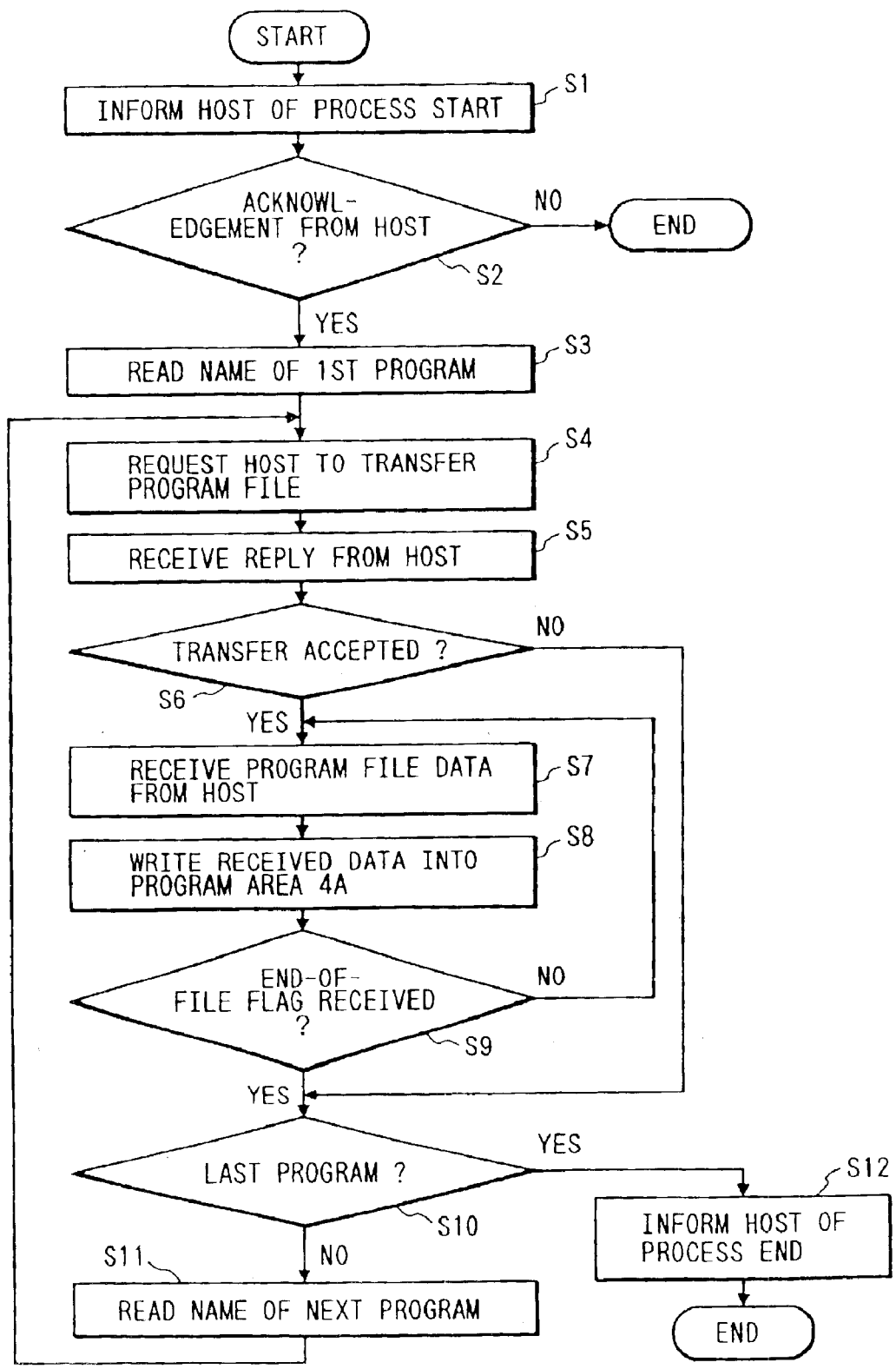
FIG. 24 is a flowchart showing an example of an activation processing procedure of the compound peripheral device showing the third embodiment of the invention.

FIG. 24 is a flowchart showing an example of an activation processing procedure of the compound peripheral device showing the third embodiment of the invention. S1 to S12 indicate processing steps.

First, when the power source is turned on and the compound peripheral device is activated, the data transmitter 162 sends a processing start notification to the host computer (S1). Subsequently, the data receiver 161 waits for the reception of a processing start response from the host computer (S2). When the response is received, the reader 151 reads out the first program name to be loaded into the compound peripheral device from the program management table 5a which is stored into the ROM 5 (S3). A transfer request of the program file is sent into the host computer (S4). On the other hand, the data receiver 161 receives a response to the transfer request from the host computer (S5). A check is made to see if the response indicates the transfer acceptance or not (S6). If NO, the processing routine advances to step S10 and subsequent steps. If YES, the data receiver 161 receives the data transfer of the program file from the host computer (S7). The data writer 143 writes the contents of the program into the program storage area 4a in the RAM 4 (S8). A check is made to see if the flag indicative of the end of the file exists in the data received by the data receiver 161 or not (S9). If YES, it is judged by the data that all of the contents of the file of the requested program have been received. The processing routine advances to a process to transfer the program which is loaded next. Finally, when the transfer process of the program is finished, the data transmitter 162 sends a processing end notification to the host computer (S12). The processing routine on the peripheral device side is finished.

On the other hand, if NO in step S10, the name of the next program is obtained from the program management table 5a (S11). The processing routine is returned to step S4 and the above program file transfer process is repeated.

Figure 25:
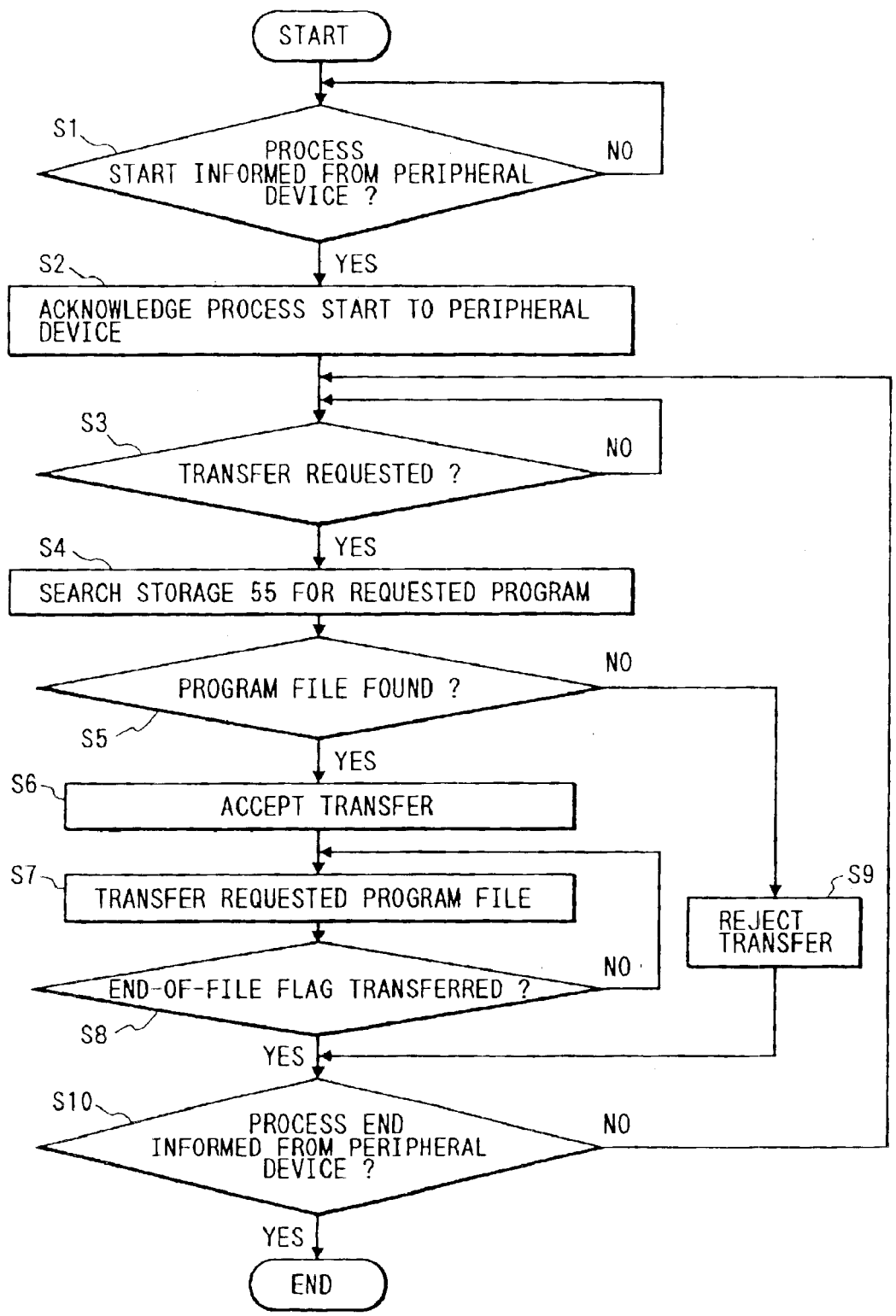
FIG. 25 is a flowchart showing an example of an activation processing procedure on the host computer side shown in FIG. 22.

FIG. 25 is a flowchart showing an example of an activation processing procedure on the host computer side shown in FIG. 22. S1 to S10 indicate processing steps. The program which resides and is being operated exists in the internal storage 54 of the host computer. The driving of each section is controlled by the program.

First, the data reader 51-1 waits for the processing start notification from the compound peripheral device (S1). When the processing start notification is received, the data transmitter 51-2 sends a processing start acceptance to the compound peripheral device (S2). Similarly, the data receiver 51-1 waits for the reception of the transfer request from the compound peripheral device (S3). When the transfer request is received, the file searcher 51-5 searches the program name sent with respect to the request from the external storage 55 (S4). A check is made to see if the requested program file has been found or not (S5). If NO, the transfer rejection is sent to the compound peripheral device (S9). The processing routine advances to step S10 and subsequent steps. If YES, the transfer acceptance is sent to the compound peripheral device (S6). After that, the reader 51-4 reads out the contents of the requested program file in the external storage 55 and the data transmitter 51-2 starts to transfer the data to the compound peripheral device (S7). A check is made to see if the flag indicative of the end of the file has been transferred or not (S8). If NO, the processing routine is returned to step S7 and the data transfer is continued. If YES, a check is made to see if the processing end notification has been received from the compound peripheral device or not (S10). If NO, namely, when the processing end notification is not sent but the transfer request is again sent from the compound peripheral device, the processing routine is returned to step S3. If YES, the processes on the host computer side are finished.

Upon execution of the program, when the button analyzer 131 recognizes that one application or either one of a plurality of applications has been designated by the operation button 3 of the input section and that the execution switch has been depressed, the data reader 141 executes the designated program in the program storage area 4a in the RAM 4.

FIG. 26 is a diagram showing the first communication protocol between the compound peripheral device shown in FIG. 1 and the server computer.

As shown in the diagram, by executing the communication process, the processes upon activation between the peripheral device and the server computer are executed and a desired program is executed.

In the embodiment, as a destination in the peripheral device into which the application program which is transferred from the host computer and is loaded is stored, the external storage 55 can be also used in place of the RAM 4. In such a case, upon execution of the program, when the button analyzer 131 recognizes that one application or either one of a plurality of applications has been designated by the operation button 3 of the input section and that the execution switch has been depressed, the designated one of a plurality of programs is read and the data reader 141 reads the designated program from among the programs written in the external storage 55. The designated program in the program storage area 4a in the RAM 4 is executed.

Figure 27:
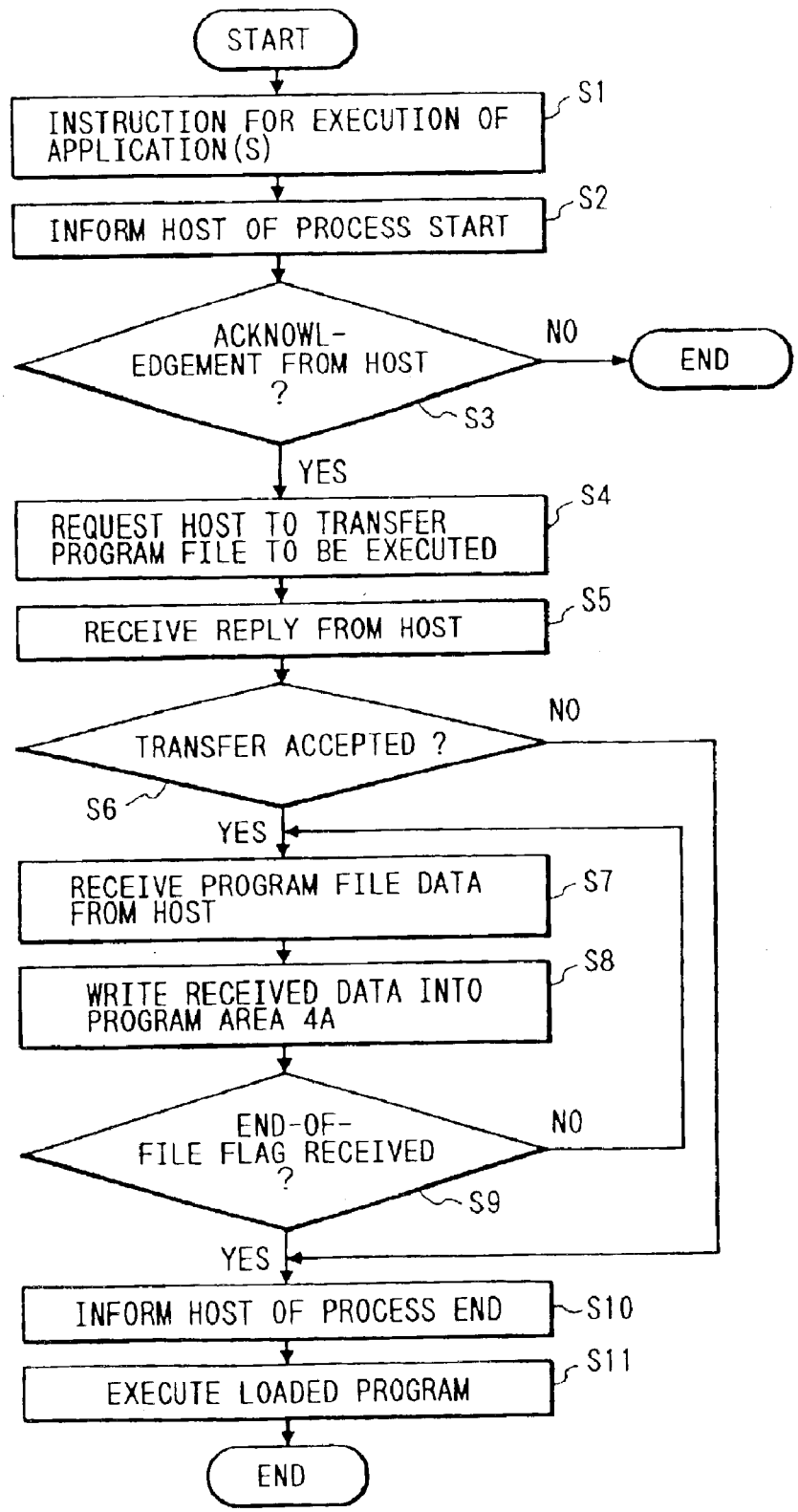
FIG. 27 is a flowchart showing an example of an execution processing procedure of an application on the peripheral device side in the compound peripheral device according to the invention.

FIG. 27 is a flowchart showing an example of an application execution processing procedure on the peripheral device side in the compound peripheral device according to the invention. S1 to S11 indicate processing steps. The processes shown in the embodiment correspond to the processes on the peripheral device side which execute the closed application in the peripheral device.

First, when the button analyzer 131 recognizes that one application or either one of a plurality of applications has been designated by the operation button 3 and that the execution switch 3b has been depressed (S1), the data transmitter 162 transmits the processing start notification to the host computer (S2). Subsequently, the data transmitter 161 waits for the reception of the processing start acceptance from the host computer (S3). If NO, the processing routine is finished. If YES, the reader 151 reads out the name of the program to be executed from the program management table 5a in the ROM 5 and the data transmitter 162 sends a transfer request of the program name file to the host computer (S4). The data receiver 161 receives a response to the transfer request from the host computer (S5). A check is made to see if the response is the transfer acceptance or not (S6). If NO (transfer rejection), the processing routine advances to step S10 to send the processing end notification to the host computer. If YES, namely, when the transfer acceptance is received, the data receiver 161 waits for the data transfer of the program file from the host computer. When the data transfer is received (S7), the data writer 143 sequentially writes the contents of the program into the program storage area 4a in the RAM 4. Subsequently, a check is made to see if the flag indicative of the file end exists in the received data or not (S9). If NO, the processing routine is returned to step S7. If YES, it is judged by the data that all of the contents of the file of the requested program have been received. The data transmitter 162 sends the processing end notification to the host computer and the loading process is finished (S10). The executer 142 executes the program stored in the program storage area 4a in the RAM 4 (S11). The processing routine is finished.

Figure 28:
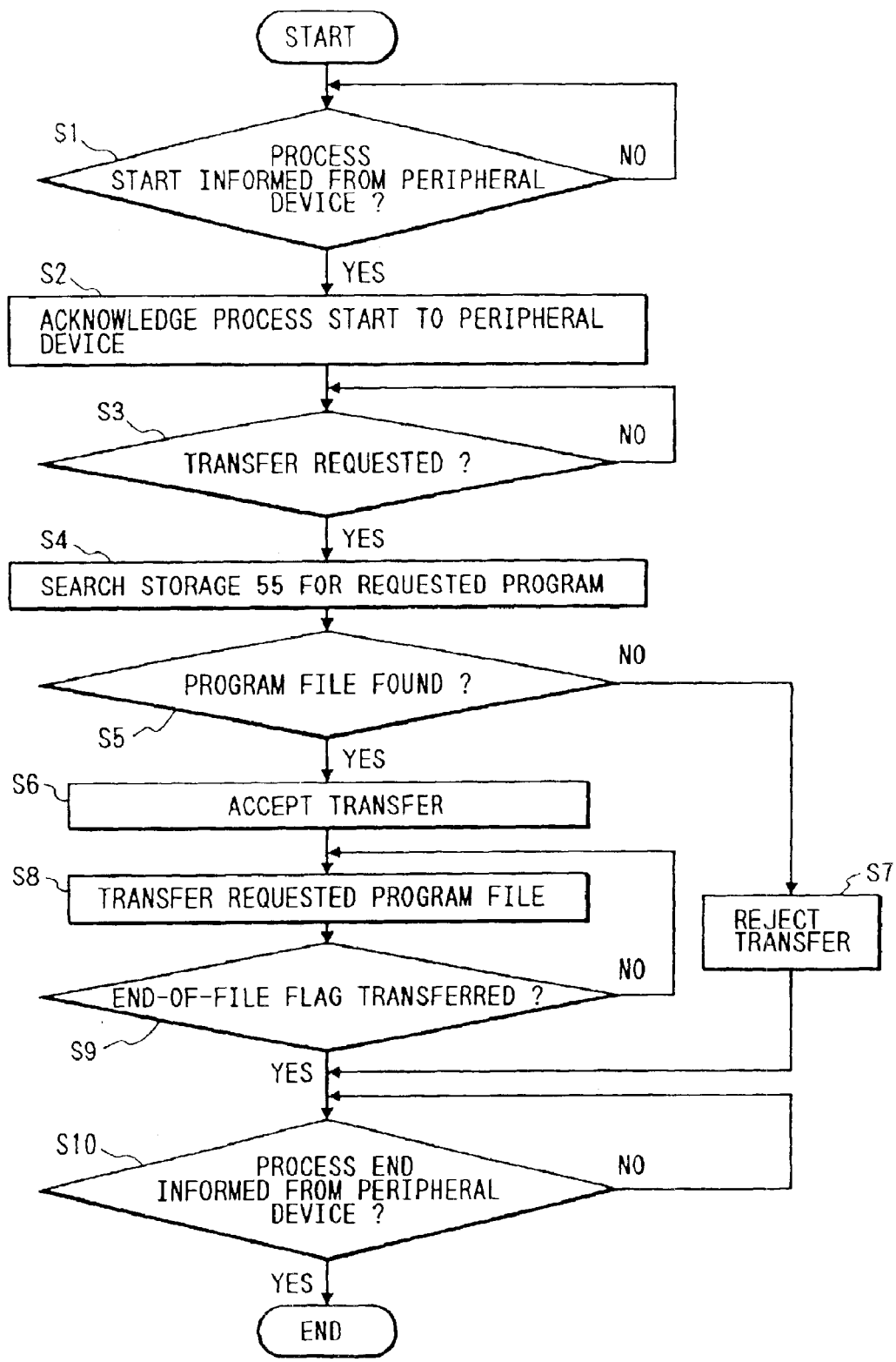
FIG. 28 is a flowchart showing an example of an execution processing procedure of an application on the host computer side shown in FIG. 22.

FIG. 28 is a flowchart showing an example of an application execution processing procedure on the host computer side shown in FIG. 22. S1 to S10 indicate processing steps. The processes in the steps of the program which reside and is being executed in the internal storage 54 of the computer are executed by each section of the controller 51.

First, the data receiver 51-1 waits for the reception of the processing start notification from the compound peripheral device (S1). When the processing start notification is received, the data transmitter 51-2 sends a processing start acceptance to the host computer (S2). Similarly, the data receiver 51-1 waits for the reception of the transfer request from the compound peripheral device (S3). When the transfer request is received, the file searcher 51-5 searches the program name sent with respect to the request from the external storage 55 (S4). A check is made to see if the requested program file has been found or not (S5). When the requested program file is not found, the transfer rejection is sent to the compound peripheral device (S7). In order to wait for the reception of the processing end notification, the processing routine advances to step S10. When the requested program file is found, the data transmitter 51-2 sends the transfer acceptance to the compound peripheral device (S6). The reader 51-4 reads out the contents of the requested program file in the external storage 55 and the data transmitter 51-2 starts to transfer the data to the compound peripheral device (S8). A check is now made to see if the flag indicative of the file end has been transferred or not (S9). If NO, the processing routine is returned to step S8. If YES, the apparatus waits for the reception of the processing end notification from the compound peripheral device (S10). When the processing end notification is received, the processes on the host computer side are finished.

Figure 29:
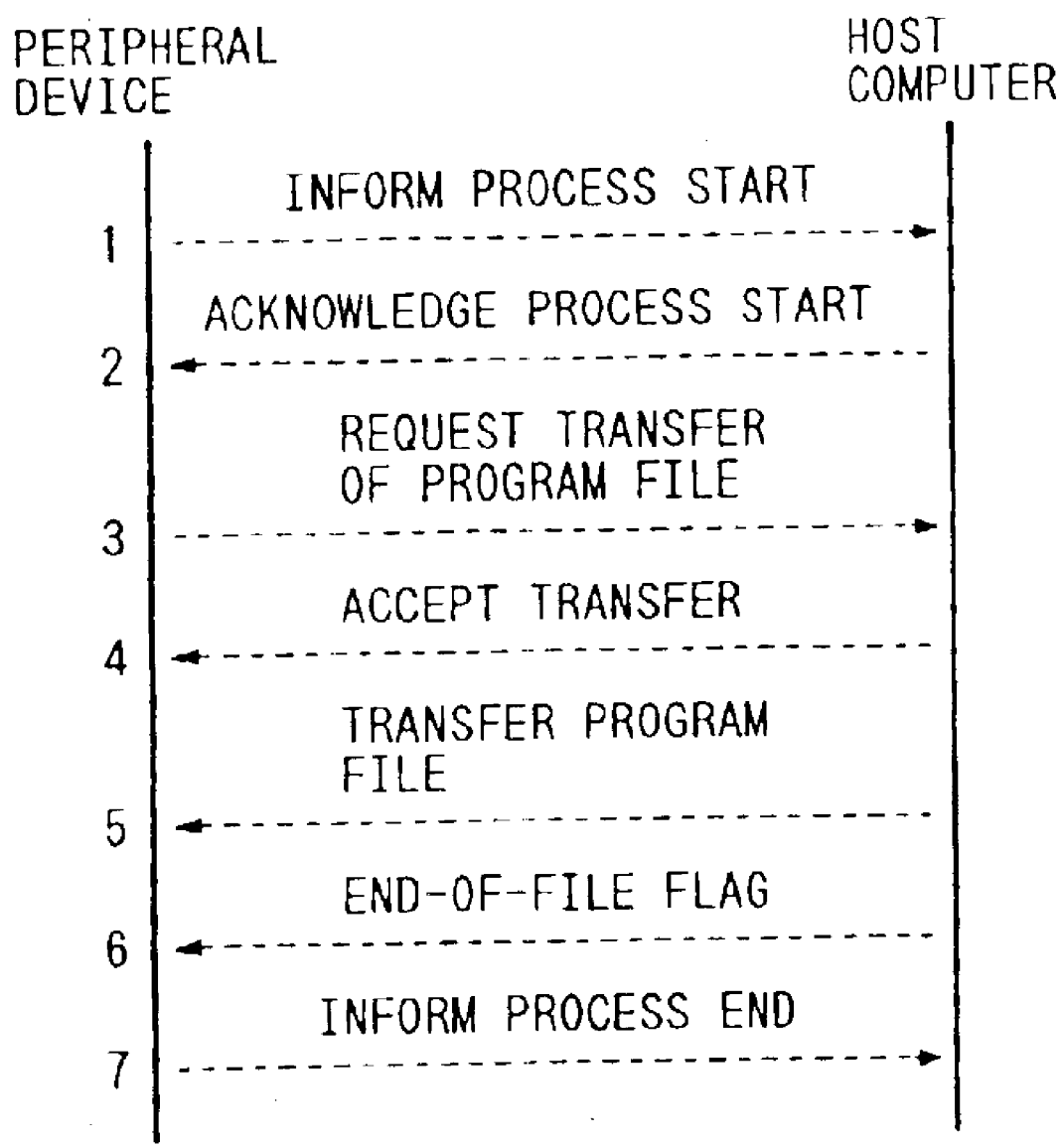
FIG. 29 is a diagram showing a communication protocol between the compound peripheral device shown in FIGS. 22 and 23 and the host computer.

FIG. 29 is a diagram showing a communication protocol between the compound peripheral device shown in FIGS. 22 and 23 and the host computer.

As shown in the diagram, by executing the communicating process, the processes upon activation between the peripheral device and the host computer are performed and a desired program is executed.

Figure 30:
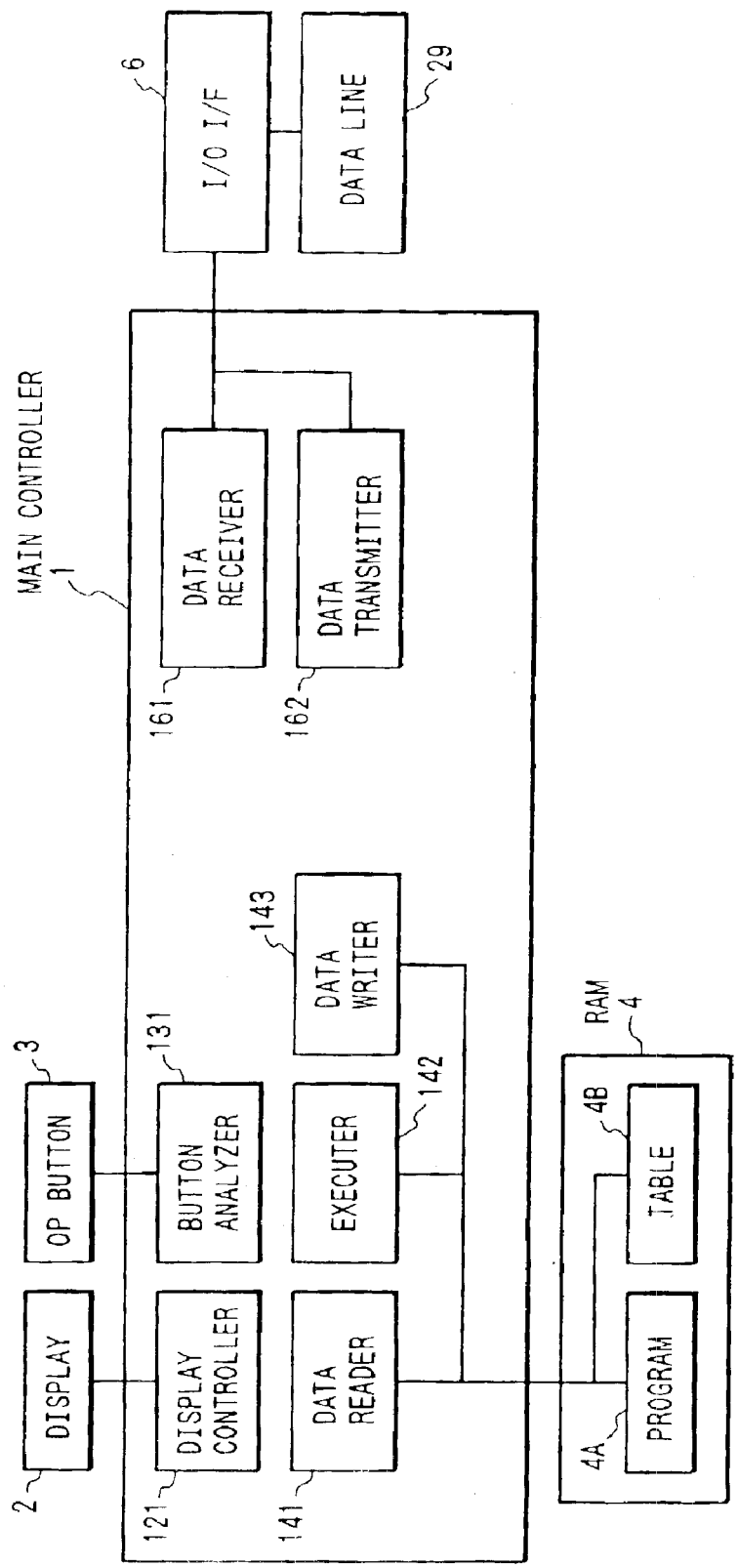
FIG. 30 is a block diagram showing another constructional example of the compound peripheral device shown in FIG. 23.

FIG. 30 is a block diagram showing another constructional example of the compound peripheral device shown in FIG. 23 and the same portions as those shown in FIG. 23 are designated by the same reference numerals.

The application execution processing operation on the compound peripheral device side shown in FIG. 30 will now be described hereinbelow with reference to a flowchart shown in FIGS. 31A and 31B.

Figure 31B:
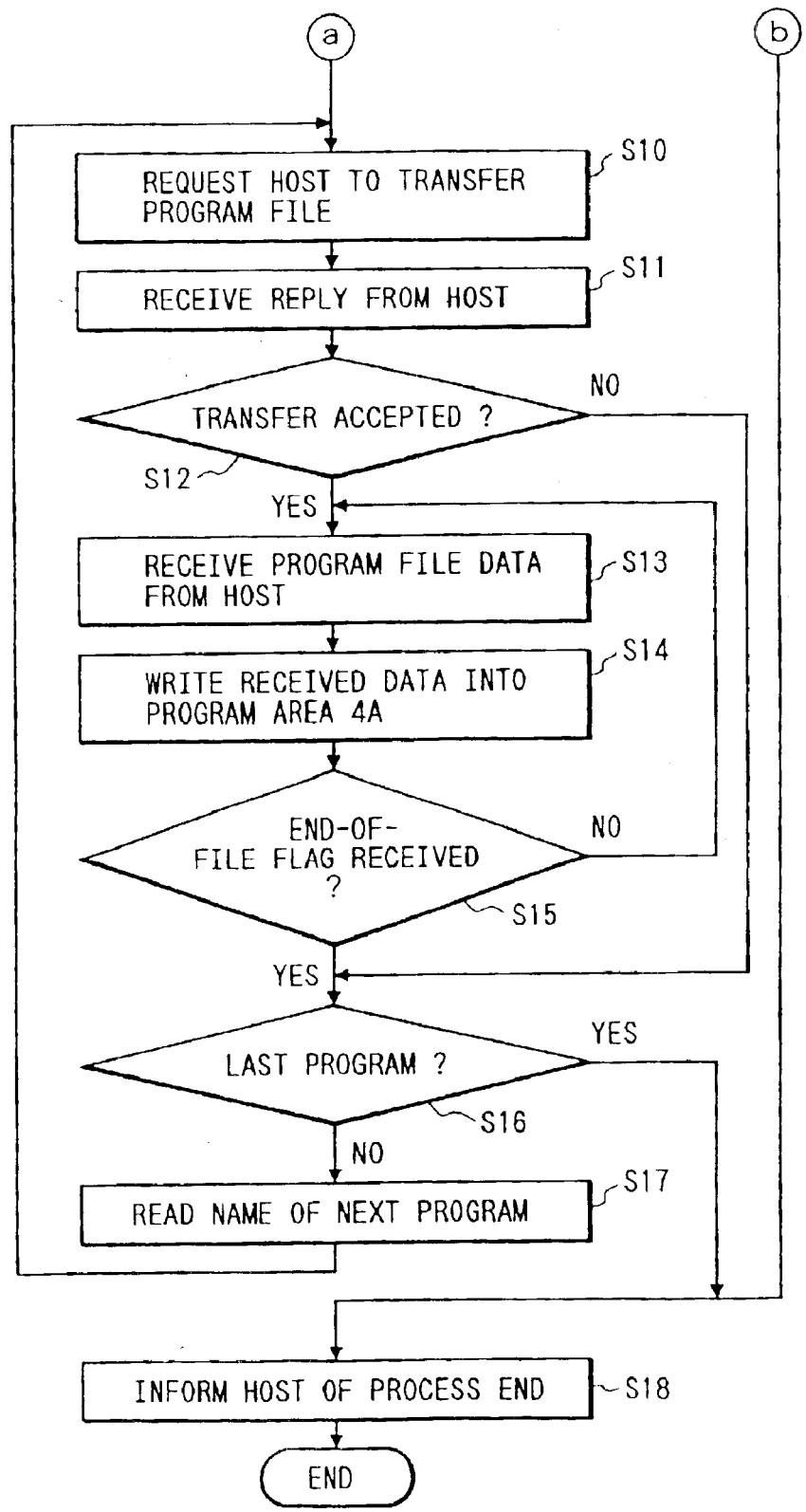
FIG. 31 is comprised of FIG. 31A and FIG. 31B showing flowcharts illustrating an example of an execution processing procedure of the application on the compound peripheral device side shown in FIG. 30.

FIGS. 31A and 31B are flowcharts showing an example of an application execution processing procedure on the compound peripheral device side shown in FIG. 30. S1 to S18 indicate processing steps.

When the power supply is turned on and the compound peripheral device is activated, the data transmitter 162 sends the processing start notification to the host computer (S1). A check is made to see if the data receiver 161 has received the processing start acceptance from the host computer or not (S2). If NO, the processing routine is finished. When the processing start acceptance is received, the data transmitter 162 sends the transfer request of the list of the application programs closed in the compound peripheral device to the host computer (S3). Due to this, the data receiver 161 receives a response to the transfer request from the host computer (S4). A check is made to see if the response is the transfer acceptance or not (S5). In case of the transfer rejection, in order to send the processing end notification to the host computer, the processing routine advances to step S18. When the transfer acceptance is received, the data receiver 161 receives the data transfer of the program list from the host computer (S6). When the data transfer is received, the data writer 143 sequentially writes the contents of the program into the program management table storage area 4b in the RAM 4 (S7). A check is now made to see if the flag indicative of the end of the list is included in the received data or not (S8). If NO, the processing routine is returned to step S6. If YES, it is judged by the data that all of the contents of the requested list have been received or not. The data reader 141 reads the first program name from the program management table 4b in the RAM 4 (S9). The data transmitter 162 sends the transfer request of the program name file to the host computer (S10). The data receiver 161 receives a response from the host computer (S11). A check is made to see if the response is the transfer acceptance or not (S12). If NO, the processing routine advances to step S16 and subsequent steps. If YES, the data receiver 161 waits for the data transfer of the program file from the host computer. When the data transfer is received (S13), the data writer 143 sequentially writes the contents of the program into the program storage area 4a in the RAM 4 (S14). A check is made to see if the flag indicative of the file end is included in the data received by the data receiver 161 or not (S15). If NO, the processing routine is returned to step S13. If YES, the processing routine advances to the transfer process of the next program in the program management table 4b. A check is made to see if the transfer process of the last program has been finished or not (S16). If YES, the processing routine advances to step S18 and subsequent steps and the data transmitter 162 transmits the processing end notification to the host computer and the processing routine is finished. If NO, the name of the next program is obtained from the program management table 4b (S17). The processing routine is returned to step S10.

Figure 33:
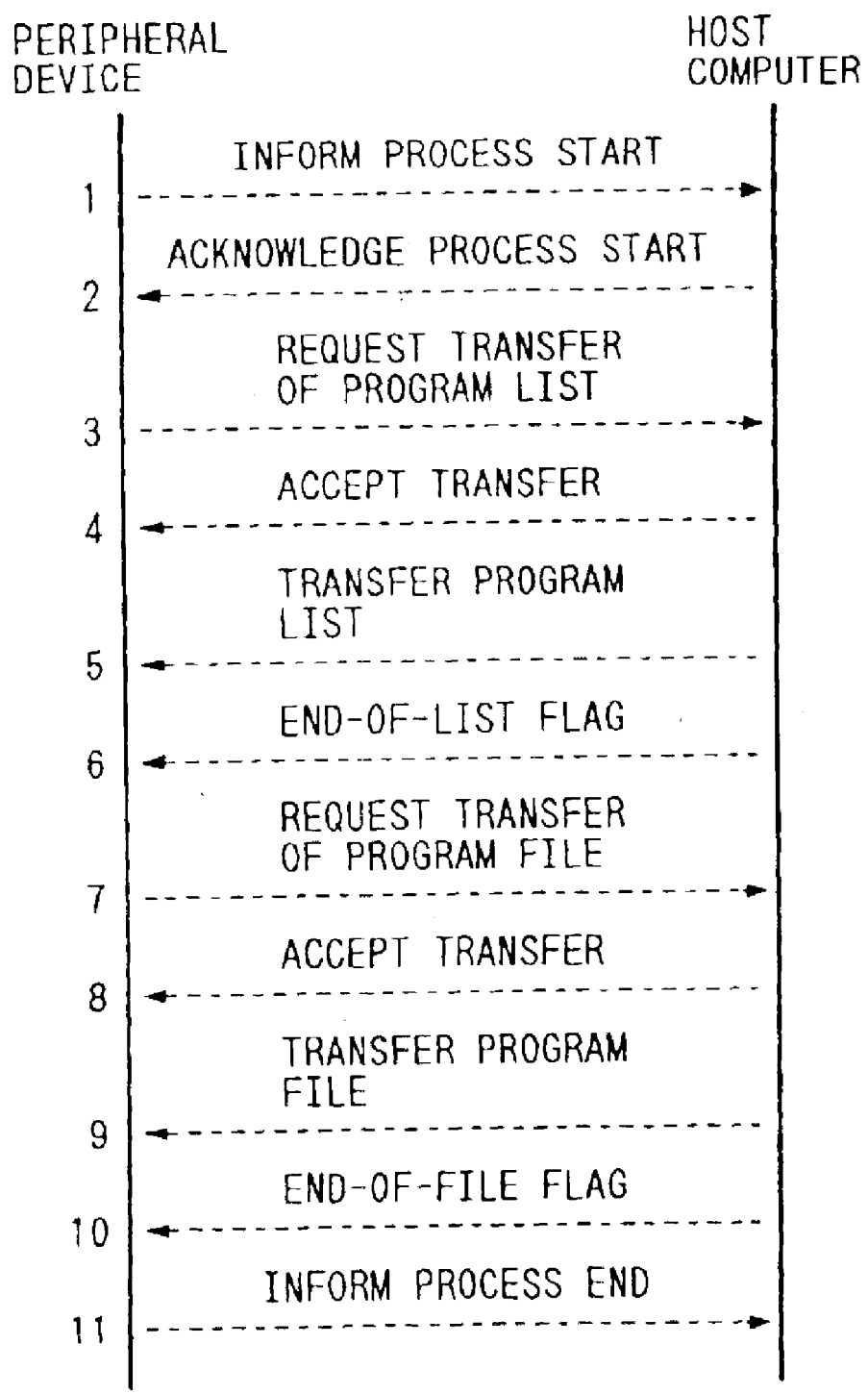
FIG. 33 is a diagram showing a communication protocol between the compound peripheral device shown in FIGS. 22 and 23 and the host computer.

The application of the processes as mentioned above is executed in accordance with a communication protocol as shown in FIG. 33.

Figure 32B:
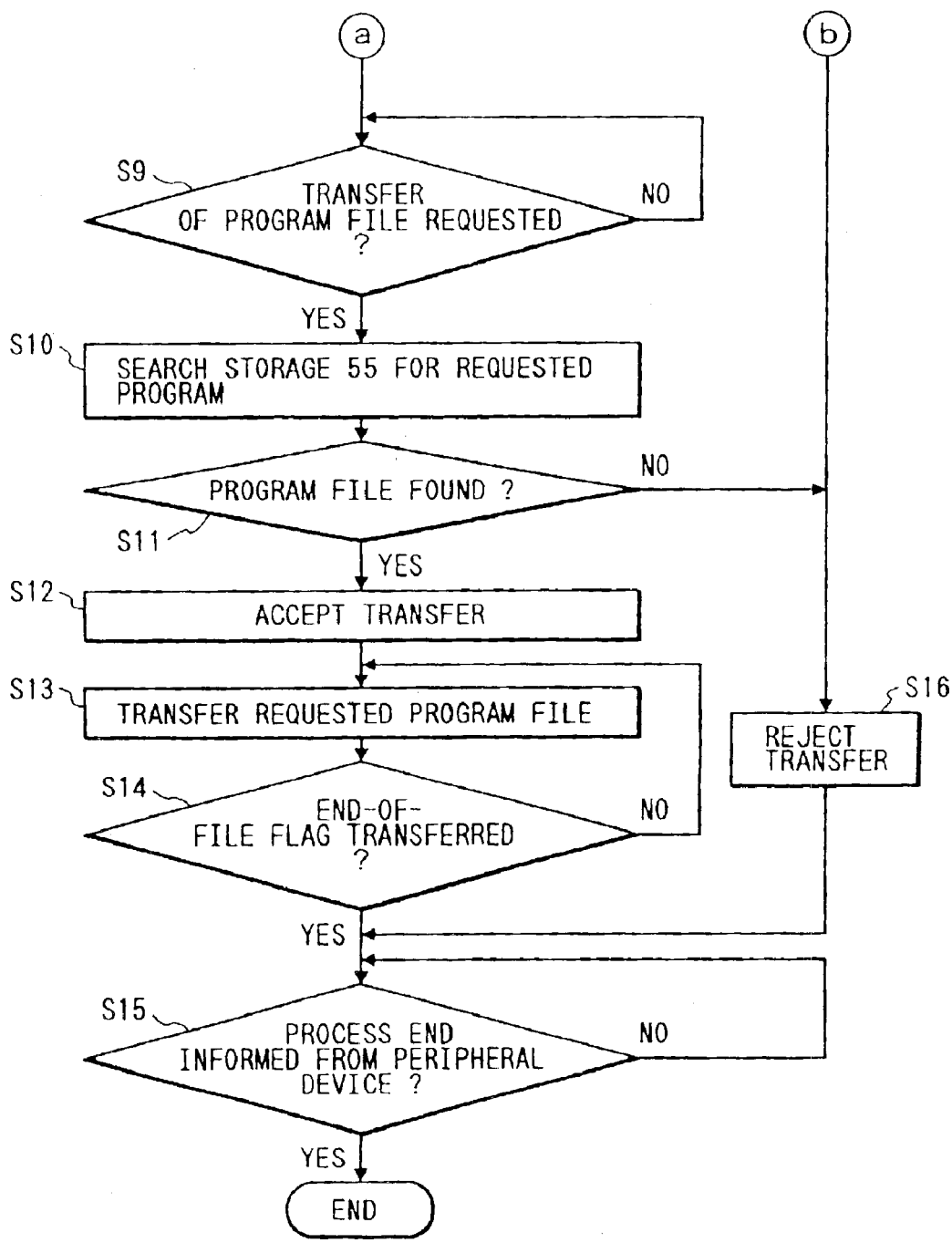
FIG. 32 is comprised of FIG. 32A and FIG. 32B showing flowcharts illustrating an example of an execution processing procedure of an application on the host computer side shown in FIG. 22.

FIGS. 32A and 32B are flowcharts showing an example of an application execution processing procedure on the host computer side shown in FIG. 22. S1 to S16 indicate processing steps. The process is executed by each section on the basis of the program stored as a resident program in the internal storage 54.

First, the data receiver 51-1 waits for the processing start notification from the peripheral device (S1). When the processing start notification is received, the data transmitter 51-2 sends the processing start acceptance to the host computer (S2). In a manner similar to the above, the apparatus waits for the reception of the list transfer request from the compound peripheral device by the data receiver 51-1 (S3). When the transfer request is received, the file searcher 51-5 searches the list of applications closed in the compound peripheral device from the external storage 55 (S4). A check is made to see if the program list has been found or not (S5). If NO, the transfer rejection is sent to the compound peripheral device (S16). In order to wait for the processing end notification, the processing routine is returned to step S15.

On the other hand, if YES in step S5, the transfer acceptance is sent to the compound peripheral device (S6). The reader 51-4 reads out the contents of the program list of the applications closed in the compound peripheral device which exist in the external storage 55 and the data transmitter 51-2 starts to transfer the data of the program list toward the compound peripheral device (S7). A check is now made to see if the flag indicative of the list end has been transferred or not (S8). If NO, the processing routine is returned to step S7. If YES, the data receiver 51-1 waits for the processing end notification and waits for the reception of the file transfer request from the peripheral device (S9). When the file transfer request is received, the file searcher 51-5 searches the program name sent with respect to the request from the external storage 55 (S10). A check is made to see if the requested program file has been found or not (S11). If NO, step S16 follows and the transfer rejection is transferred to the compound peripheral device and the data receiver 51-1 waits for the processing end notification. If YES, the transfer acceptance is sent to the compound peripheral device (S12). After that, the data receiver 51-1 reads out the contents of the requested program file in the external storage 55 and the data transmitter 51-2 starts to transfer the data toward the compound peripheral device (S13). A check is made to see if the flag indicative of the file end has been transferred or not (S14). If NO, the processing routine is returned to step S13. If YES, the apparatus waits for the reception of the processing end notification from the compound peripheral device from the data receiver 51-1 (S15). If YES, the processes on the host computer side are finished. If NO, for instance, when the processing end notification is not sent but the transfer request is again sent from the compound peripheral device, the processing routine is returned to step S13. The application of the data transfer of the program file mentioned above is continued in accordance with the communication protocol as shown in FIG. 33.

[Fourth Embodiment]

Figure 34:
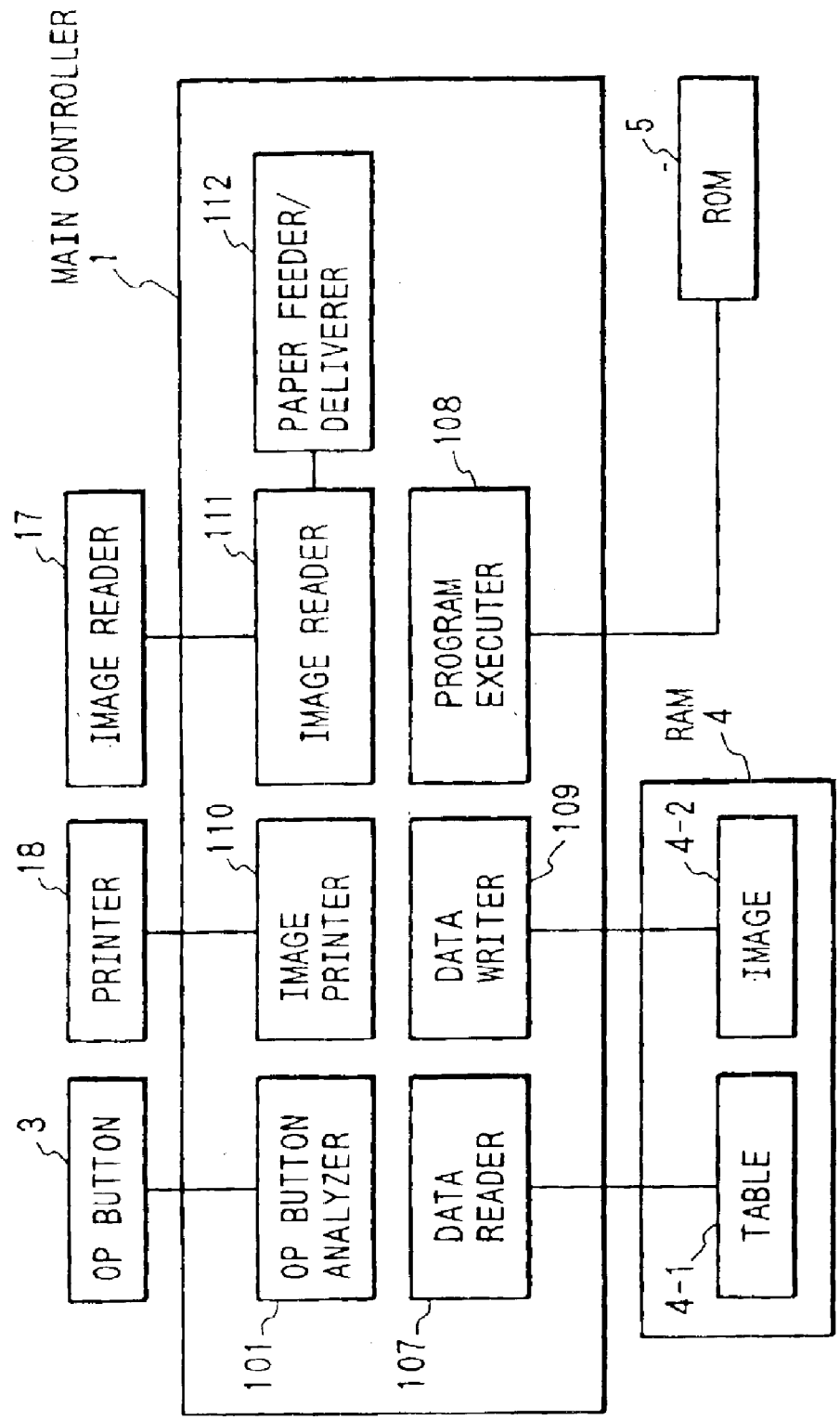
FIG. 34 is a block diagram showing the first function processing construction in a compound peripheral device showing the fourth embodiment of the invention.

FIG. 34 is a block diagram showing the first function processing construction in the compound peripheral device showing the fourth embodiment of the invention and the same portions as those shown in FIGS. 1 and 3 are designated by the same reference numerals. In the embodiment, the first function process denotes the copy function.

In the diagram, reference numeral 101 denotes an operation button analyzer to recognize an input from the operation button 3; 107 a data reader to read out the data written in the RAM 4; 108 a program executer to execute the control program stored in the ROM 5; 109 a data writer to write data into the RAM 4; and 110 an image printer to print the image information stored in the RAM 4. A printer engine can be constructed by an ink jet mechanism or a laser printer mechanism.

Reference numeral 111 denotes an image reader to read an original image by a designated resolution. The image reader 111 can read a multivalue image and/or a color image and can execute various kinds of image editing processes by an image processor (not shown). Reference numeral 112 denotes a paper feeder/deliverer having an ADF function or an RDF function for feeding an original to the image reader 111 and delivering the original to a predetermined position after the original image was read.

Reference numeral 4-1 denotes a program management table storage area and the address of the foregoing loaded program has been stored in the area 4-1. Reference numeral 4-2 denotes an image data storage area to store the image data which is output from the image reader 111.

The copy function processing operation will now be described hereinbelow.

When the button analyzer 101 recognizes that a "copy start" switch has been depressed, the reader 107 reads out the program start address of the program of a copy application from the program management table 4-1. The program executer 108 executes a "copy" program in the ROM 5 from the start address.

When the "copy" program is started, the paper feeder/deliverer 112 feeds the paper set in the image reading apparatus. After that, the image reader 111 reads the image data of the paper set by an amount of a predetermined memory capacity. The data writer 109 stores read image data into the image data storage area 4-2. The image printer 110 sends the stored image data to the printer 18 and prints the image data of an amount of the read data. When there is no image to be read by the image reader 111, the paper feeder/deliverer 112 delivers the paper of the image reading apparatus and the program of the "copy" application is finished.

Figure 35:
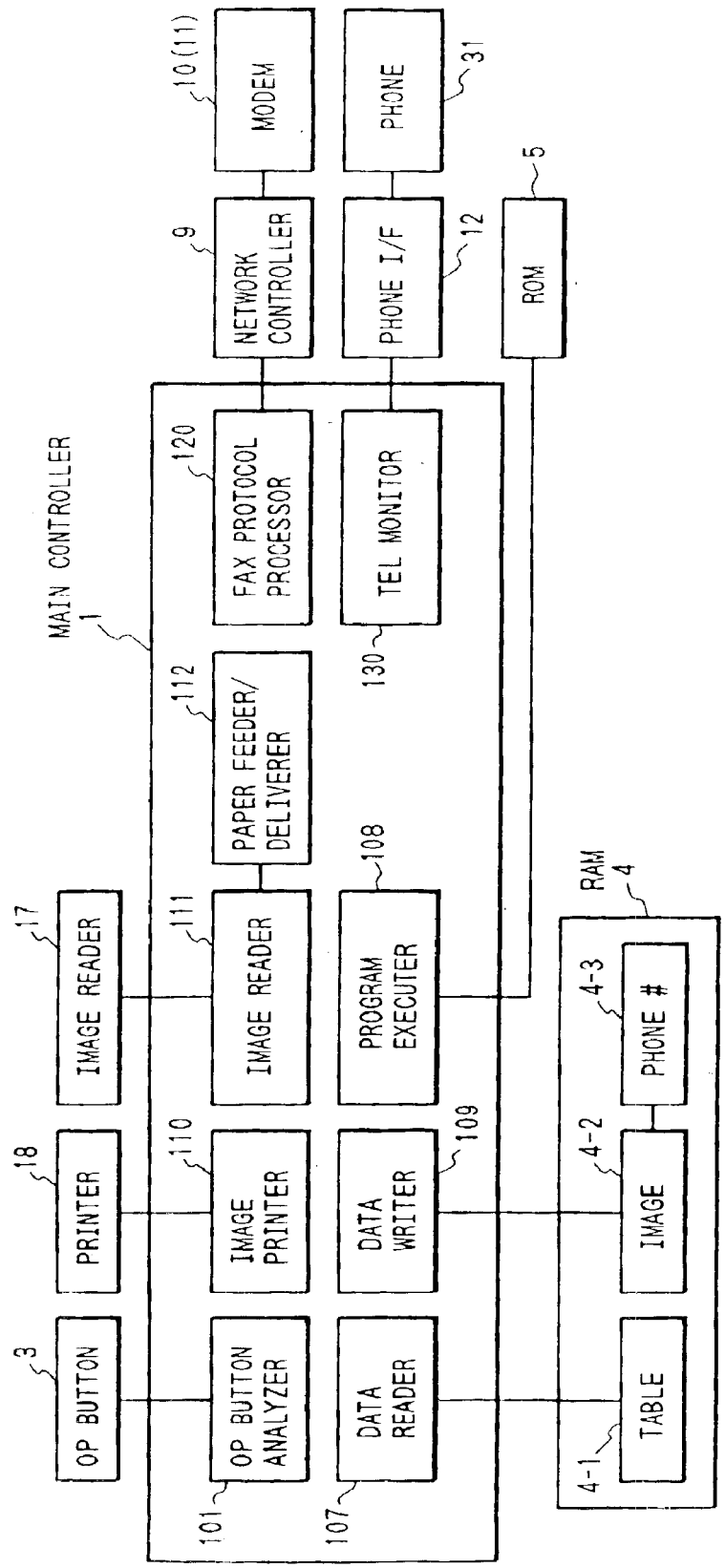
FIG. 35 is a block diagram showing the second function processing construction in the compound peripheral device showing the fourth embodiment of the invention.

FIG. 35 is a block diagram showing the second function processing construction in the compound peripheral device showing the fourth embodiment of the invention and the same portions as those shown in FIGS. 1, 3, and 34 are designated by the same reference numerals. In the embodiment, the second function process denotes a facsimile transmitting function.

In the diagram, reference numeral 120 denotes a facsimile protocol processor to control an image communication on a telephone line through the network controller 9 in accordance with a predetermined communication control procedure (facsimile protocol: G3, G4). Reference numeral 130 denotes a telephone monitor to monitor a speech communication state by the telephone line which is connected through the phone interface 12.

Reference numeral 4-3 denotes a phone number train storage area to store a train of telephone numbers which were dialed from the telephone.

The facsimile transmission function processing operation will now be described hereinbelow.

When the button analyzer 101 recognizes that a "facsimile transmission start" switch has been depressed, the reader 107 reads out the program start address of the facsimile transmission application from the program management table 4-1. The program executer 108 executes a "facsimile transmission" program in the ROM 5 from the start address.

When the "facsimile transmission" program is started, the operator dials from the telephone. The dial signal is transmitted through the connection line with the telephone 31. The phone interface 12 analyzes the dial signal and writes the number train into the phone number storage area 4-3 through the data writer 109. When the button analyzer 101 again recognizes that the "facsimile transmission start" switch has been depressed, the reader 107 sends the number train which has already been input to the network controller 9, thereby making a telephone call. When the telephone line is connected, the facsimile protocol processor 120 starts the protocol of the facsimile. After completion of the initial protocol, the paper feeder/deliverer 112 feeds the paper set in the image reader 17. After that, the image reader 111 reads the image data of the original set in the image reader 17 by an amount of a predetermined memory capacity. The data writer 109 stores the read image data into the image data storage area 4-2. The facsimile protocol processor 120 sends the image data stored in the image printer 110 to the network controller 9, thereby facsimile transmitting the image data through the modem 10 or 11. When there is no image to be read by the image reader 111, the paper feeder/deliverer 112 delivers the original in the image reader 17 and feeds the next original. When the next original cannot be fed, it is judged at this time point that the paper to be transmitted is finished, so that the facsimile protocol processor 120 executes an end protocol and, after that, disconnects the line. The program of the "facsimile transmission" application is finished.

Figure 36:
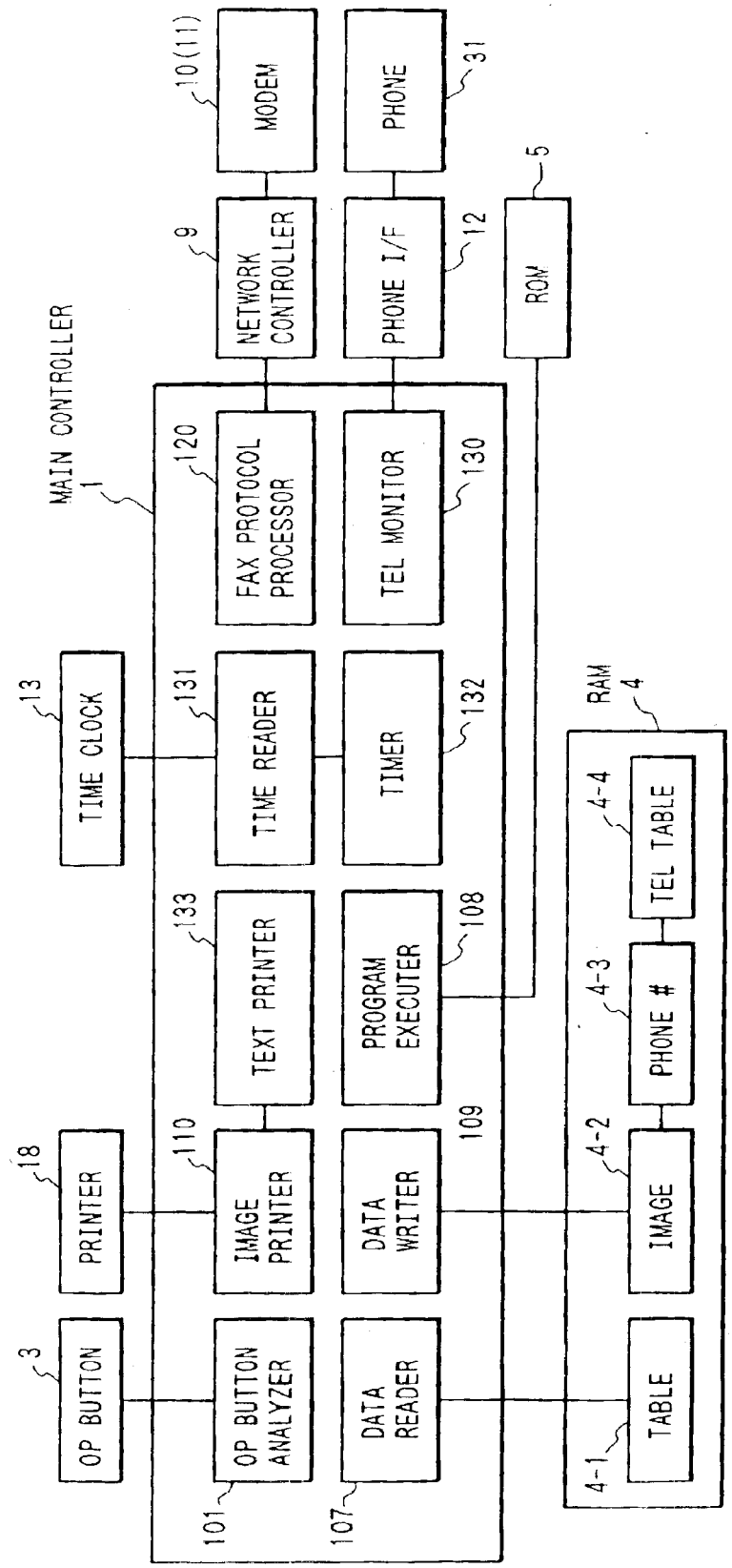
FIG. 36 is a block diagram showing the third function processing construction in the compound peripheral device showing the fourth embodiment of the invention.

FIG. 36 is a block diagram showing the third function processing construction in the compound peripheral device showing the fourth embodiment of the invention. The same portions as those shown in FIGS. 1, 3, 34, and 35 are designated by the same reference numerals. In the embodiment, the third function process denotes a printing function of a speech communication record.

In the diagram, reference numeral 131 denotes a time reader to read out time data from the time clock 13 and 132 indicates a timer to calculate the time from the start of the speech communication to the end thereof. The communication time is written into a telephone speech communication recording table 4-4 by the data writer 109. Reference numeral 133 denotes a text printer to form print data by a table form in accordance with the order of the transmission partner side, date, and speech communication time.

The print function processing operation of the speech communication record will now be described. In the embodiment, the processes are separately executed with respect to the resident portion and the non-resident portion.

First, in the resident portion, the telephone monitor 130 monitors whether a telephone call has been made through the phone interface 12 or not. When the telephone dials, the telephone monitor 130 stores the phone number train into the phone number storage area 4-3 through the data writer 109. When it is recognized that the call has been transmitted and the telephone line has been connected, the data writer 109 adds the record into the telephone table 4-4 and the telephone number of the partner's telephone and the date data are stored. After that, when it is recognized that the line has been disconnected, the date of the line disconnection is similarly obtained. The timer 132 calculates the elapsed time from the start time. The elapsed time is stored into the record in the telephone table 4-4 through the data writer 109.

On the other hand, in the non-resident portion, when the button analyzer 101 recognizes that a "speech record print start" switch has been depressed, the reader 107 reads out the program start address of the speech communication record printing application from the program management table 4-1. The program executer 108 executes the "speech communication record print" program in the ROM 5 from the start address.

When the "speech communication record print" program is started, the text printer 133 forms the print data in the table form on the basis of each record data in the telephone table 4-4 in accordance with the order of the transmission destination, date, and speech communication time. The image printer 110 sends the print data to the printer 18, thereby printing. At a time point when the print data of all of the records is finished, the "speech communication record print" program is finished.

Figure 37:
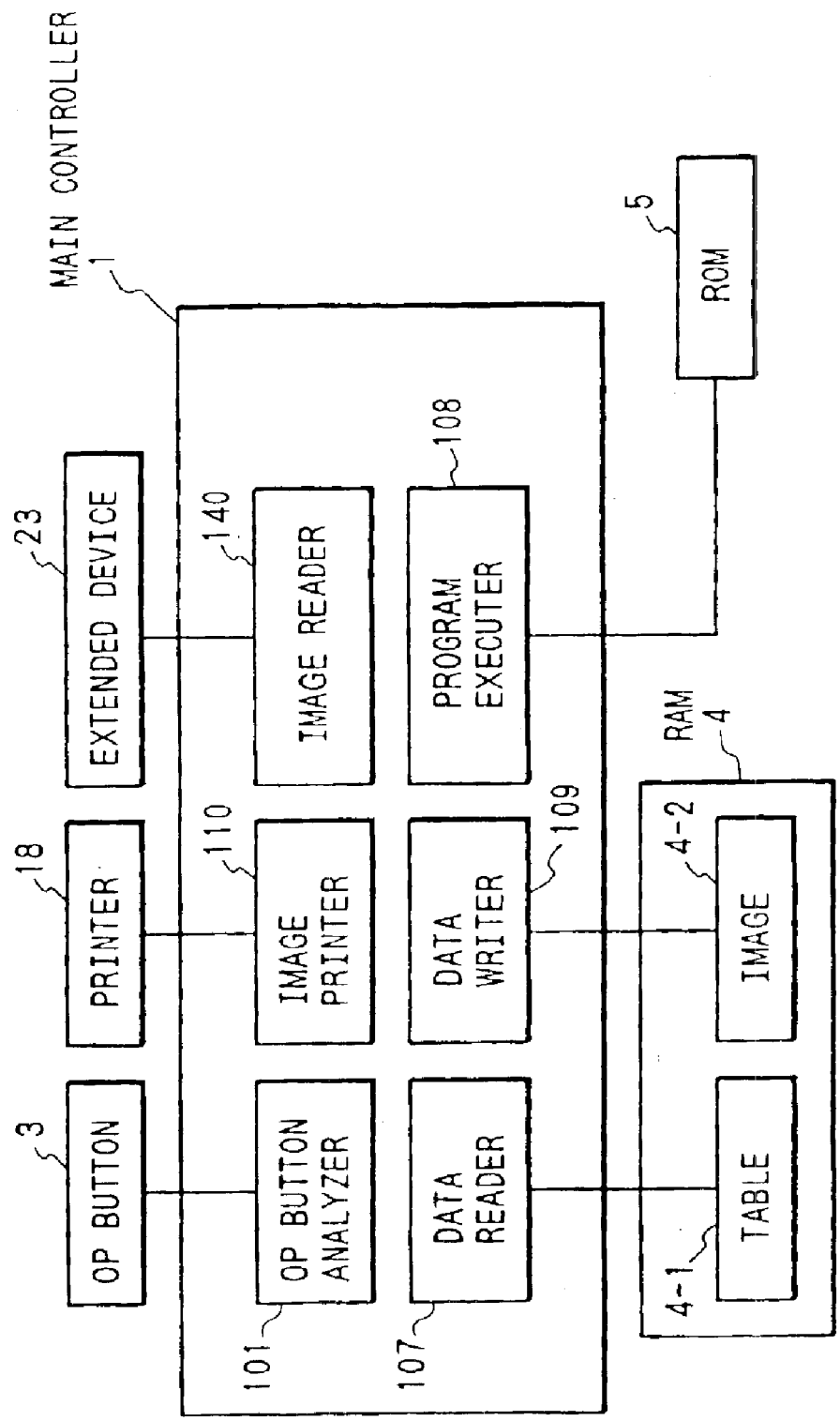
FIG. 37 is a block diagram showing the fourth function processing construction in the compound peripheral device showing the fourth embodiment of the invention.

FIG. 37 is a block diagram showing the fourth function processing construction in the compound peripheral device showing the fourth embodiment of the invention. The same portions as those shown in FIGS. 1, 3, 34, and 35 are designated by the same reference numerals. In the embodiment, the fourth function process denotes a printing function of a still video.

In the diagram, reference numeral 140 denotes an image reader for reading out the image data of a still video by the extended device 23 such as a still video camera or by an image processing apparatus (VTR, video camera, or the like) having a still video output function.

The print function processing operation of the still video will now be described hereinbelow.

When the button analyzer 101 recognizes that a "print start of the still video" switch has been depressed, the reader 107 reads out the program start address of a printing application of the still video from the program management table 4-1. The program executer 108 executes a "print of the still video" program in the ROM 5 from the start address.

When the "print of the still video" program is started, the image reader 140 reads the current still image data stored in the still video (extended device 23) by an amount of a predetermined memory capacity. The data writer 109 stores the read image data into the image data storage area 4-2.

After image data was stored, the image printer 110 sends the stored image data to the printer 18, thereby printing the image data of an amount of the read image. When there is no image to be read by the image reader 140, it is judged that the printing of the still images of one picture plane was finished, so that the "print of the still video" program is finished.

FIG. 38 is a block diagram showing the fifth function processing construction in the compound peripheral device showing the fourth embodiment of the invention. The same portions as those shown in FIGS. 1, 3, 34, and 35 are designated by the same reference numerals. In the embodiment, the fifth function process denotes a function process execution alerting function.

In the diagram, reference numeral 102 denotes a display controller to control the display to the display 2; 103 an alarm output for driving the sound source 15 and alarming a message indicating that the function process is being executed or the like; 104 a usage information notifier for monitoring a usage situation of a device, for example, the printer 18 or the like and notifying its usage situation information to a command transmitter 106; 105 a command receiver for receiving and analyzing a command from the host computer; 106 the command transmitter for transmitting a preparation OK command to the host computer; and 4-5 an in-use message storage area in which a message to inform a competition state accompanied with the function process has been stored.

In the case where a "copy" function process is being executed as a function processing state, when the command receiver 105 receives the command from the host computer, the usage information notifier 104 confirms the usage situation of the printer. When the printer 18 is being used, the command transmitter 106 returns a command indicating that the printer is being used to the host computer.

On the other hand, when the button analyzer 101 recognizes that a "copy start" switch has been depressed, the usage information notifier 104 obtains the usage situation of the printer 18. When the printer is not used at present, the "copy" function process is executed as mentioned above.

When there is an output request from the host computer to the printer 18, the usage information notifier 104 obtains the usage situation of the printer 18. When the print data is at present being printed, this means that the printer 18 is being used, the in-use message stored in the in-use message storage area 4-5 is read out through the data reader 107. The display controller 102 allows the display 2 to display an in-use message stored in the in-use message storage area 4-5. The alarm output 103 generates an alarm sound from the speaker 16 through the sound source 105.

As described above, according to the first invention of the present invention, on the basis of the selection execution instruction by the instructing means, the program executing means reads out either one of the application programs which were down loaded into the memory means from the server computer and executes and the driving of either one of the function processing means is controlled. Therefore, the function process of the compound peripheral device can be freely extended.

According to the second invention, since the memory means is constructed by the internal memory medium, only the necessary application can be down loaded.

According to the third invention, since the memory means is constructed by the external memory medium, a plurality of applications can be simultaneously down loaded.

According to the fourth invention, since either one of the application programs to be down loaded from the server computer is selected and designated by an instruction from the application selecting means, only a desired application can be down loaded.

According to the fifth invention, since the transfer means reads out either one of the application programs stored in the memory means and transfers to another compound peripheral device through a predetermined communication line, either one of the applications can be also relayed and transferred to a compound peripheral device which doesn't have a communicating function with the server computer.

According to the sixth invention, on the basis of the selection execution instruction by the instructing means, the program executing means reads out either one of the application programs which were down loaded into the memory means from the host computer and executes and the driving of either one of the function processing means is controlled. Therefore, the function of each function processing means can be cheaply added or extended by using a simple network.

According to the seventh invention, since the memory means is constructed by the internal memory medium, only the necessary application can be down loaded.

According to the eighth invention, since the memory means is constructed by the external memory medium, a plurality of applications can be simultaneously down loaded.

According to the ninth invention, since the application selecting means selects and designates either one of the application programs to be down loaded from the memory means, only a desired application can be down loaded.

According to the tenth invention, since the designating means previously designates either one of the application programs to be down loaded from the host computer, the designation application program transfer control from the host computer can be simplified and the designated application can be efficiently down loaded.

According to the eleventh invention, on the basis of the selection execution instruction by the instructing means, either one of the application program read out from the external memory means is loaded and stored into the internal memory means, the program executing means executes the loaded application, and the driving of either one of the function processing means is controlled. Therefore, even when a memory capacity of the internal memory means is small, while a plurality of necessary applications are down loaded in a lump, the necessary application is selected and each function process can be efficiently executed.

According to the twelfth invention, the combination function instructing state by the instructing means is analyzed, the combination drive control means sequentially reads out each application stored in the memory means, and the combination driving of each function processing means is controlled. Therefore, an advanced compound function process in which various kinds of function processes are combined can be executed.

According to the thirteenth invention, the combination function instructing state by the instructing means is analyzed and while the present using state of each function processing means for executing the combination function process is judged, the control means exclusively controls the start of the execution of the designated combination function process. Therefore, the combination function process and each function process can be efficiently executed while avoiding the competition between the combination function process and each function process.

According to the fourteenth invention, since the control means informs the present using state of each function processing means, the competition state of the combination function process and each function process can be certainly informed to the user.

Therefore, there is an excellent effect such that a change in function of each function processing means, an extension of the function, or the like can be cheaply and efficiently executed without connecting any external apparatus to the compound peripheral device.

What is claimed is:

1. A multi-functional apparatus of an all-in-one type having a plurality of functions, said multi-functional apparatus comprising:

a plurality of devices having respective functions, the plurality of devices including at least one printing device;

designation means for designating one of the functions of said multi-functional apparatus, each function utilizing at least one of said plurality of devices;

control means for controlling at least one of said plurality of devices for execution of the one function designated by said designation means;

management means for managing, for each extension program for execution of one of the functions of said multi-functional apparatus, a terminal number for specifying an external apparatus that contains the extension program and a program number for specifying the extension program from among a plurality of extension programs contained in the external apparatus, using a program management table;

acquisition means for acquiring the terminal number for specifying the external apparatus that contains the extension program for execution of the designated one function and the program number for specifying that extension program from the program management table, for extension of the functions of said multi-functional apparatus; and downloading means for communicating with the external apparatus specified by the terminal number acquired by said acquisition means and downloading the extension program specified by the program number acquired by said acquisition means from the specified external apparatus.

2. A multi-functional apparatus according to claim 1, wherein the extension program comprises a program for directly controlling at least one of said plurality of devices.

3. A multi-functional apparatus according to claim 1, wherein the extension program comprises a program for executing image processing on an image input with one of said plurality of devices.

4. A multi-functional apparatus according to claim 1, wherein said downloading means collectively downloads a plurality of the extension programs.

5. A method of controlling a multi-functional apparatus of an all-in-one type having a plurality of functions, said method comprising the steps of:

designating one of the plurality of functions of said multi-functional apparatus, each function utilizing at least one of a plurality of devices having respective functions, the plurality of devices including at least one printing device;

controlling at least one of said plurality of devices for execution of the one function designated by said designating step;

managing, for each extension program for execution of one of the functions of said multi-functional apparatus, a terminal number for specifying an external apparatus that contains the extension program and a program number for specifying the extension program from among a plurality of extension programs contained in the external apparatus, using a program management table;

acquiring the terminal number for specifying the external apparatus that contains the extension program for execution of the designated one function and the program number for specifying that extension program from the program management table, for extension of the functions of said multi-functional apparatus; and downloading, by communicating with the external apparatus specified by the terminal number acquired in said acquiring step, the extension program specified by the program number acquired in said acquiring step from the specified external apparatus.

6. A method according to claim 5, wherein the extension program comprises a program for directly controlling at least one of said plurality of devices.

7. A method according to claim 5, wherein the extension program comprises a program for executing image processing on an image input with one of said plurality of devices.

8. A method according to claim 5, wherein said downloading step collectively downloads a plurality of the extension programs.

* * * * *